United States Patent [19]
Lee et al.

[11] Patent Number: 5,825,824
[45] Date of Patent: Oct. 20, 1998

[54] DC-BALANCED AND TRANSITION-CONTROLLED ENCODING METHOD AND APPARATUS

[75] Inventors: Kyeongho Lee, Mapo-Gu; Deog-Kyon Jeong, HyoJaChon, both of Rep. of Korea

[73] Assignee: Silicon Image, Inc., Cupertino, Calif.

[21] Appl. No.: 622,810

[22] Filed: Mar. 27, 1996

Related U.S. Application Data

[63] Continuation-in-part of Ser. No. 539,816, Oct. 5, 1995.

[51] Int. Cl.$^6$ .............................. H04L 25/34; H04J 3/24; H03M 5/00
[52] U.S. Cl. ........................ 375/292; 375/290; 370/473; 341/58
[58] Field of Search .................................... 375/292, 290; 341/58, 95, 59, 52, 68; 370/472, 473; 371/37.05

[56] References Cited

U.S. PATENT DOCUMENTS

| | | | |
|---|---|---|---|
| 4,216,426 | 8/1980 | Flora | 455/28 |
| 4,408,189 | 10/1983 | Betts et al. | 340/347 |
| 4,463,342 | 7/1984 | Langdon, Jr. et al. | 340/347 |
| 4,464,765 | 8/1984 | Shimizu | 375/17 |
| 4,486,739 | 12/1984 | Franaszek | 340/347 |
| 4,528,550 | 7/1985 | Graves et al. | 340/347 |
| 4,584,695 | 4/1986 | Wong et al. | 375/81 |
| 4,677,421 | 6/1987 | Taniyama | 340/347 |
| 4,682,334 | 7/1987 | Le Mouel et al. | 371/55 |
| 4,709,170 | 11/1987 | Li | 307/511 |
| 4,926,447 | 5/1990 | Corsetto et al. | 375/120 |
| 4,975,916 | 12/1990 | Miracle et al. | 371/47.1 |
| 5,022,051 | 6/1991 | Crandall et al. | 375/19 |

(List continued on next page.)

FOREIGN PATENT DOCUMENTS

| | | |
|---|---|---|
| 0 556 981 A1 | 8/1993 | European Pat. Off. |
| 88/06384 | 8/1988 | WIPO . |
| 92/22160 | 12/1992 | WIPO . |

OTHER PUBLICATIONS

Guided Scrambling: A New Line Coding Technique for High Bit Rate Fiber Optic Transmission Systems; 8089 IEE Transactions on Communications 39(1991) Feb., No. 2, New York, U.S. I. Fair, W. Grover, Senior Member, IEEE, W. Krzymien, Member, IEEE, R. MacDonald, Senior Member, IEEE; pp. 289–296.

Widmer, A.X. and Franaszek, P.A., "Transmission Code For High–Speed Fibre–Optic Data Networks", Mar. 17, 1983, *Electronics Letters*; vol. 19 No. 6, (pp. 202 & 203).

*Primary Examiner*—Chi H. Pham
*Assistant Examiner*—Khai Tran
*Attorney, Agent, or Firm*—Fenwick & West LLP

[57] ABSTRACT

A method and apparatus for producing a transition-controlled, DC-balanced sequence of characters from an input sequence of data bytes. The bits in each of the data bytes are selectively complemented in accordance with the number of logical '1' signals in each data byte in order to produce selectively complemented data blocks. A cumulative disparity is then determined between the logical values of different type included within ones of the selectively complemented data blocks previously encoded into characters. In addition, a current disparity in a candidate character associated with a current one of the selectively complemented data blocks being encoded is also determined. The candidate character is assigned to the current one of the selectively complemented data blocks if the current disparity is of a polarity opposite to a first polarity of the cumulative disparity. Alternately, the complement of the candidate character is assigned to the current one of the selectively complemented data blocks if the current disparity is of the first polarity. In a high-transition mode of operation, the bits within data blocks including fewer than a minimum number of logical '1' signals are selectively complemented so that each such selectively complemented data block includes in excess of the minimum number of logical transitions. In a low-transition mode of operation, the bits within data blocks having more than a predefined number of logical '1' signals are selectively complemented so that each such selectively complemented data block includes less than the maximum number of logical transitions.

17 Claims, 18 Drawing Sheets

U.S. PATENT DOCUMENTS

| | | | |
|---|---|---|---|
| 5,132,633 | 7/1992 | Wong et al. | 328/14 |
| 5,200,979 | 4/1993 | Harris | 375/292 |
| 5,239,561 | 8/1993 | Wong et al. | 375/81 |
| 5,260,608 | 11/1993 | Marbot | 307/262 |
| 5,268,937 | 12/1993 | Marbot | 375/121 |
| 5,295,079 | 3/1994 | Wong et al. | 364/484 |
| 5,304,952 | 4/1994 | Quiet et al. | 331/1 A |
| 5,329,251 | 7/1994 | Llewellyn | 331/2 |
| 5,329,559 | 7/1994 | Wong et al. | 375/119 |
| 5,339,050 | 8/1994 | Llewellyn | 331/16 |
| 5,359,301 | 10/1994 | Candage | 331/57 |
| 5,410,600 | 4/1995 | Toy | 380/9 |
| 5,420,545 | 5/1995 | Davis et al. | 331/18 |
| 5,438,621 | 8/1995 | Hornak et al. | 380/43 |

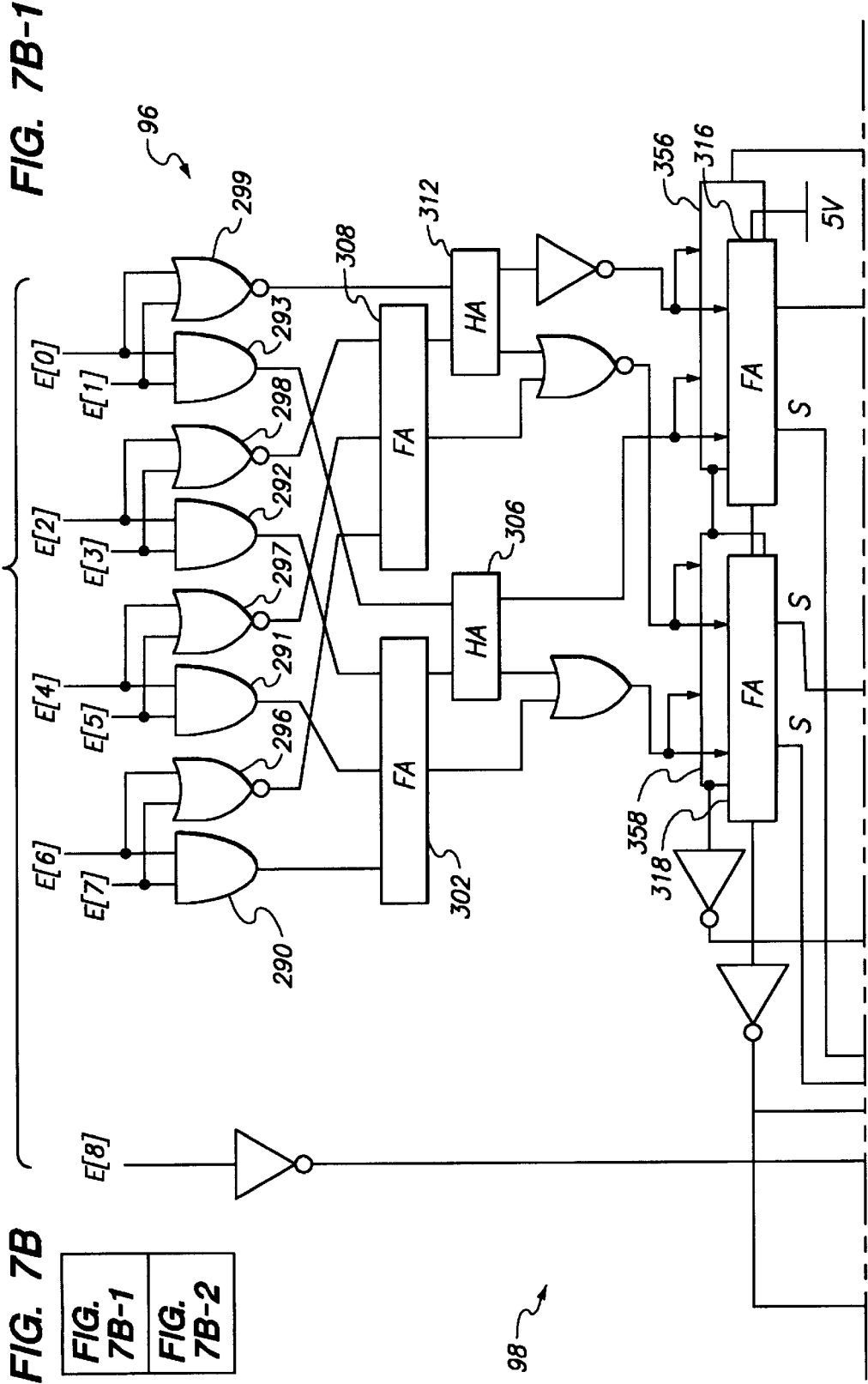

DC-BALANCED AND TRANSITION-CONTROLLED ENCODING METHOD AND APPARATUS

CROSS-REFERENCE TO RELATED APPLICATION

This application is a continuation-in-part of copending application Ser. No. 08/539,816, filed Oct. 5, 1995, the disclosure of which is herein incorporated by reference.

BACKGROUND OF THE INVENTION

I. Field of the Invention

This invention relates to coding schemes for digital transmission systems. More particularly, the present invention relates to a DC-balanced, transition-controlled coding system in which an unbalanced datastream is converted to a DC-balanced stream to facilitate transmission.

II. Description of the Related Art

As electronic and computer technology continues to evolve, communication of information among different devices, either situated near by or at a distance becomes increasingly important. For example, it is now more desirable than ever to provide for high speed communications among different chips on a circuit board, different circuit boards in a system, and different systems with each other. It is also increasingly desirable to provide such communications at very high speeds, especially in view of the large amount of data required for data communications in intensive data consuming systems using graphical or video information, multiple input-output channels, local area networks, and the like.

It is particularly desirable to enable individual personal computers, workstations, or other computing devices, within which data is normally internally transferred using parallel data buses, to communicate with each other over relatively simple transmission lines. Such transmission lines typically include only one or two conductors, in contrast with the 64-bit and wider data paths within computing systems now commonly available. In the case of video data transmission to computer displays, as well as in the case of high-speed video input from digital cameras to computer systems, existing interconnection interfaces typically employ such parallel data paths. Recently, the requisite bandwidth of such interconnection systems has increased as a consequence of increased display resolution. This has increased electromagnetic interference (EMI) as well as transmission line noise, thereby raising concerns as to safety and reliability. In addition, the large number of signal and data lines required by advanced liquid crystal display panels has increased the potential for mutual interference.

There have been a number of commercially available products which attempt to provide high speed conversion of parallel data to serial form and transmission over a serial link. The Hewlett-Packard G-link chip set is one such product. That chip set includes a transmitter set and is capable of handling 21-bit wide parallel data. To obtain the necessary speed, however, the chip set is fabricated using a bipolar process, and the receiver and transmitter require separate chips. Such a solution is highly power consumptive and expensive.

Another commercial solution has been provided by Bull of France. The Bull technology employs a frequency multiplier for parallel to serial data conversion. Such devices typically introduce noise into the silicon substrate and interfere with other multipliers on the chip. In addition, the Bull technology uses an exclusive OR tree for parallel to serial conversion. The use of exclusive OR trees is well known, together with the difficulty of equalizing the delay through all paths of such devices. Additionally, the Bull technology uses output signals having full logic swings. This results in slower performance.

Various techniques exist for improving the characteristics of transmission over serial links. For example, transmission codes may be employed to alter the frequency spectrum of the transmitted serial data so as to facilitate clock recovery and enable AC coupling. Each transmission code will also typically provide special characters, not included within the data alphabet, to be used in character synchronization, frame delimiting, as well as perhaps for diagnostic purposes. Coding may also be employed to reduce transmission bandwidth as a means of limiting the signal distortion occurring during propagation through the transmission medium. In the case of wire links, it is desirable to utilize codes with no DC and little low frequency content in order to allow for DC isolation of the driver and receiver circuitry from the transmission line, as well as to reduce signal distortion on the line. An efficient coding system should also be disposed to encode clock information with the encoded data in a manner allowing for extraction of the clock information during decoding. This obviates the need for provision of a separate clock signal over a dedicated clock line, since the clock information recovered during decoding may be instead used by the receiver circuitry.

Within local area networks (LANs), transmission coding schemes exist for converting words of various length to characters of greater length. For example, three-bit words may be converted to four-bit characters (3B/4B), four-bit words may be converted to five-bit characters (4B/5B), and so on. Typically, coding and decoding is achieved using a "key" in which each word is mapped to a corresponding character. Unfortunately, the complexity of this type of mapping scheme generally precludes utilization of random logic, and often requires implementations involving look-up tables or the like. This is disadvantageous given that look-up tables realized using ROM consume significant chip area and tend to slow circuit operation.

A particular 8B/10B coding scheme is described in U.S. Pat. No. 4,486,739. In particular, a binary DC balanced code and associated encoder circuit are described as being operative to translate an 8 bit byte of information into 10 binary digits for transmission. The 8B/10B coder is partitioned into a 5B/6B plus a 3B/4B coder. Despite ostensibly facilitating DC-balanced encoding, this system tends to require relatively lengthy encoding and decoding intervals.

Although progress has been made in the development of coding techniques disposed to facilitate serial data transmission, there remains a need for a coding scheme capable of efficiently supporting very high speed serial data transmission. Such a coding scheme should also be DC-balanced in order to facilitate AC coupling and clock recovery. In addition, it would be desirable to provide a coding scheme capable of facilitating real-time data transfer by allowing for rapid synchronization during decoding. In addition, it would be desirable to provide a coding scheme capable of producing a DC-balanced datastream without the necessity of providing additional bits to indicate whether a particular block was modified by the balance-encoding scheme.

SUMMARY OF THE INVENTION

In one aspect, the present invention is directed to a method and apparatus for producing a transition-controlled, DC-balanced sequence of characters from an input sequence of data bytes. The bits in each of the data bytes are selectively complemented in accordance with the number of logical '1' signals in each data byte in order to produce selectively complemented data blocks. A cumulative disparity is then determined between the logical values of different type included within ones of the selectively complemented data blocks previously encoded into characters. In addition, a current disparity in a candidate character associated with a current one of the selectively complemented data blocks being encoded is also determined. The candidate character is assigned to the current one of the selectively complemented data blocks if the current disparity is of a polarity opposite to a first polarity of the cumulative disparity. Alternately, the complement of the candidate character is assigned to the current one of the selectively complemented data blocks if the current disparity is of the first polarity.

In a high-transition mode of operation, the bits within those of the data blocks including fewer than a minimum number of logical '1' signals are selectively complemented in order that each such selectively complemented data block include in excess of the minimum number of logical '1' signals. In a low-transition mode of operation, the bits within those of the data blocks having more than a predefined number of logical transitions are selectively complemented in order that each such selectively complemented data block includes less than the maximum number of logical transitions. During both high-transition mode and low-transition mode encoding of each such selectively complemented data block into an encoded character, a predefined bit is set indicating that selective complementing has been effected.

In another aspect, in one embodiment, an input sequence of 9-bit data blocks is balanced to produce a DC-balanced sequence of characters. A shift register generator generates a pseudo-random binary sequence. Two bits of the pseudo-random binary sequence are logically combined to determine whether to invert another bit in the pseudo-random binary sequence, thereby cycling the pseudo-random binary sequence. A bit of the pseudo-random binary sequence is used as a criterion to selectively invert all the bits in the incoming 9-bit data block thereby producing a 9-bit data block, in an output stream that, over time, tends to be DC-balanced.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

I. System Overview

Figure 1:
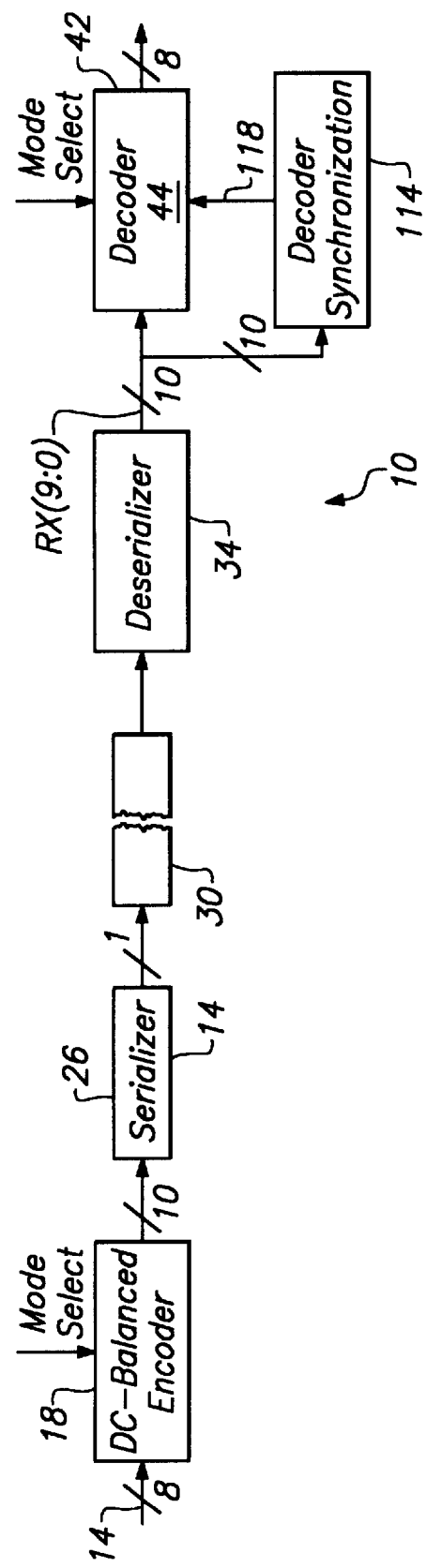
FIG. 1 is a block diagram depicting a DC-balanced encoding system of the present invention implemented within a high-speed digital transmission system.

FIG. 1 is a block diagram depicting a transition-controlled, DC-balanced encoding system of the present invention implemented within a high-speed digital transmission system 10. In the system 10 of FIG. 1, 8-bit bytes of parallel data 14 are provided to a DC-balanced encoder 18 operative to effect transition-controlled, DC-balanced 8B/10B coding in accordance with the present invention. The resultant 10B encoded characters 22 are provided to a serializer 26 disposed to convert the 10-bit characters into a serial data stream for transmission over a serial data link 30 (e.g., an optical fiber cable, or twisted-pair copper wire). As is described herein, the relatively straightforward mathematical characteristics of the encoding algorithm performed by the encoder 18 allow for economical, high-speed implementations in random logic.

The serial data stream is received from the serial data link 30 by a deserializer 34 and converted into 10-bit character data 38. The 10-bit character data 38 is then decoded into 8-bit data bytes 42 by a decoder 44. As is described hereinafter, both the encoder 18 and decoder 44 may be economically realized using simple digital logic circuits capable of real-time data processing.

II. DC-Balanced Transition-Controlled Encoding and Decoding System

The following provides a detailed description of the 8B/10B transition-controlled coding scheme carried out within the encoder 18. The transition-controlled code disclosed herein contemplates the use of either a high-transition or low-transition set of "in-band" code characters. Each high-transition in-band code character is derived from an input data byte in which four or more logical transitions exist between the eight bits thereof. Similarly, each low-transition in-band code character is derived from an input data byte in which fewer than four logical transitions exist between its eight bits. This scheme takes advantage of the fact that 128 of the 258 eight-bit ASCII codes include four or more logical transitions, and the remaining 128 ASCII codes include fewer than four logical transitions.

It has been found that each of the 128 eight-bit codes including fewer than four logical transitions may be mapped to a corresponding eight-bit code having four or more logical transitions, and vice-versa. As is described herein, this mapping may be achieved by complementing predefined bits in each eight-bit code to be mapped. During high-transition mode encoding, the bits within those input bytes having fewer than four logical transitions are selectively complemented and thereby mapped to bytes having four or more logical transitions. Alternately, during low-transition mode encoding the bits within those input bytes having four or more logical transitions are also selectively complemented and thereby mapped to bytes having fewer than four logical transitions. During both encoding modes, a bit of predefined value is appended to the selectively complemented byte in order to produce an intermediate 9-bit encoded symbol prior to creation of a corresponding 10-bit encoded character. When the input byte includes the number of logical transitions mandated by the current encoding mode (i.e, high-transition mode or low-transition mode), the appended bit is set to the complement of the predefined value in order to identify which of the 9-bit intermediate symbols include selectively complemented bytes. This results in the entire set of 256 eight-bit codes being made available for encoding into 10-bit characters during both low-transition mode and high-transition mode operation.

It may thus be appreciated that each eight-bit code converted into a 10-bit encoded character during high-transition mode operation includes four or more logical transitions. Similarly, each eight-bit code converted into a 10-bit encoded character during low-transition mode operation includes less than four logical transitions. These sets of 10-bit encoded characters capable of being produced during high-transition and low-transition modes of operation may be characterized as a high-transition set of "in-band" encoded characters, and a low-transition set of in-band encoded characters, respectively. Beyond the 256 in-band characters within the high-transition set and the 256 in-band characters of the low-transition set, there exists a high-transition set of 256 out-of-band 10-bit characters and a low-transition set of 10-bit characters. In accordance with another aspect of the invention, various synchronization and other special characters are defined using the high-transition and low-transition sets of out-of-band characters. Each character corresponding to one of these "out-of-band" characters associated with the high-transition set includes less than four logical transitions, and each of the out-of-band characters associated with the low-transition set of code characters includes more than four logical transitions. The difference in the number of transitions between in-band and out-of-band characters allows selected out-of-band characters to serve as control characters, and to be readily distinguished from in-band characters within the transmitted data stream.

Given the relatively high number of transitions within each of the in-band characters of the high-transition set, the high-transition set of characters may advantageously be employed to facilitate timing recovery. On the other hand, the low number of transitions within the code characters of the low-transition set makes this set of characters ideal for use in applications in which it is desired to minimize power consumption and/or electromagnetic interference (EMI).

In accordance with one aspect of the invention, the synchronization characters associated with both the low-transition and high-transition sets of code characters are selected so as to facilitate rapid synchronization during data recovery. When the low-transition set of code characters is being employed, a special group of out-of-band characters is used during synchronization. Each special synchronization character includes a predefined number larger than four (e.g., 7) of logical transitions between binary character values, and a predefined number (e.g., two) of "non-transitions" between character values. As will be discussed below, the special synchronization characters are selected such that random logic may be used to distinguish each special synchronization character from the in-band characters of the low-transition set. The following constitutes an exemplary set of out-of-band synchronization characters for use with the low-transition set of code characters:

1100101010
1101001010
1101010010
1101010100

It is a feature of the invention that if one of the above out-of-band synchronization characters is transmitted three or more consecutive times within any preamble period, the synchronization character is ensured of being detected during the associated data recovery process. In this regard a "preamble" sequence is sent during a preamble period preceding each transmission of encoded characters. The transmission of preamble sequences may occur not only as part of system initialization, but also at various other times to ensure that synchronization is maintained between encoding and decoding processes.

The coding scheme of the present invention is predicated on particular characteristics of the 256 different 8-bit binary code values. Referring to TABLE I, the 256 different 8-bit binary codes may be divided into eight groups G0–G7, where the binary codes within each group G0–G7 include the same number of transitions. It is observed that each binary code within group G0 can be converted to a corresponding binary code within group G7 by inverting alternate bits within the group G0 code. In the same way, each of the binary codes within groups G1, G2 and G3 may be converted to one of the binary codes within groups G6, G5 and G4, respectively, through inversion of alternate bits. As is described herein, the high-transition set of 10-bit characters is obtained by encoding of the 8-bit binary codes in groups G0–G3, and the low-transition set obtained by encoding groups G4–G7.

TABLE I

| GROUP | NUMBER OF TRANSITIONS | NUMBER OF BYTES IN GROUP | EXAMPLE BYTES IN GROUP |
|---|---|---|---|
| G0 | 0 | 2 | 00000000, 11111111 |
| G1 | 1 | 14 | 00000001, 11111110 |
| G2 | 2 | 42 | 00000010, 11111101 |
| 03 | 3 | 70 | 00000101, 11111010 |
| G4 | 4 | 70 | 00001010, 11110101 |
| G5 | 5 | 42 | 00010101, 11101010 |
| G6 | 6 | 14 | 00101010, 11010101 |
| G7 | 7 | 2 | 01010101, 10101010 |

During operation of the encoder 18 in a high-transition encoding mode, each 8-bit binary code within byte groups G0–G3 provided thereto is converted to a corresponding binary code within byte groups G4–G7 through inversion of alternate bits. Conversely, during operation in the low-transition encoding mode, each 8-bit binary code within groups G4–G7 provided to encoder 18 is mapped to a corresponding binary code within groups G0–G3. In the exemplary embodiment, the inversion of alternate bits is effected through the inversion of the even bits of the 8-bit binary codes. When the alternate bits of a given 8-bit code have been so inverted, a predefined bit within the resulting 10-bit encoded character derived from the given eight-bit code is set so as to indicate that mapping has occurred between byte groups.

Figure 2:
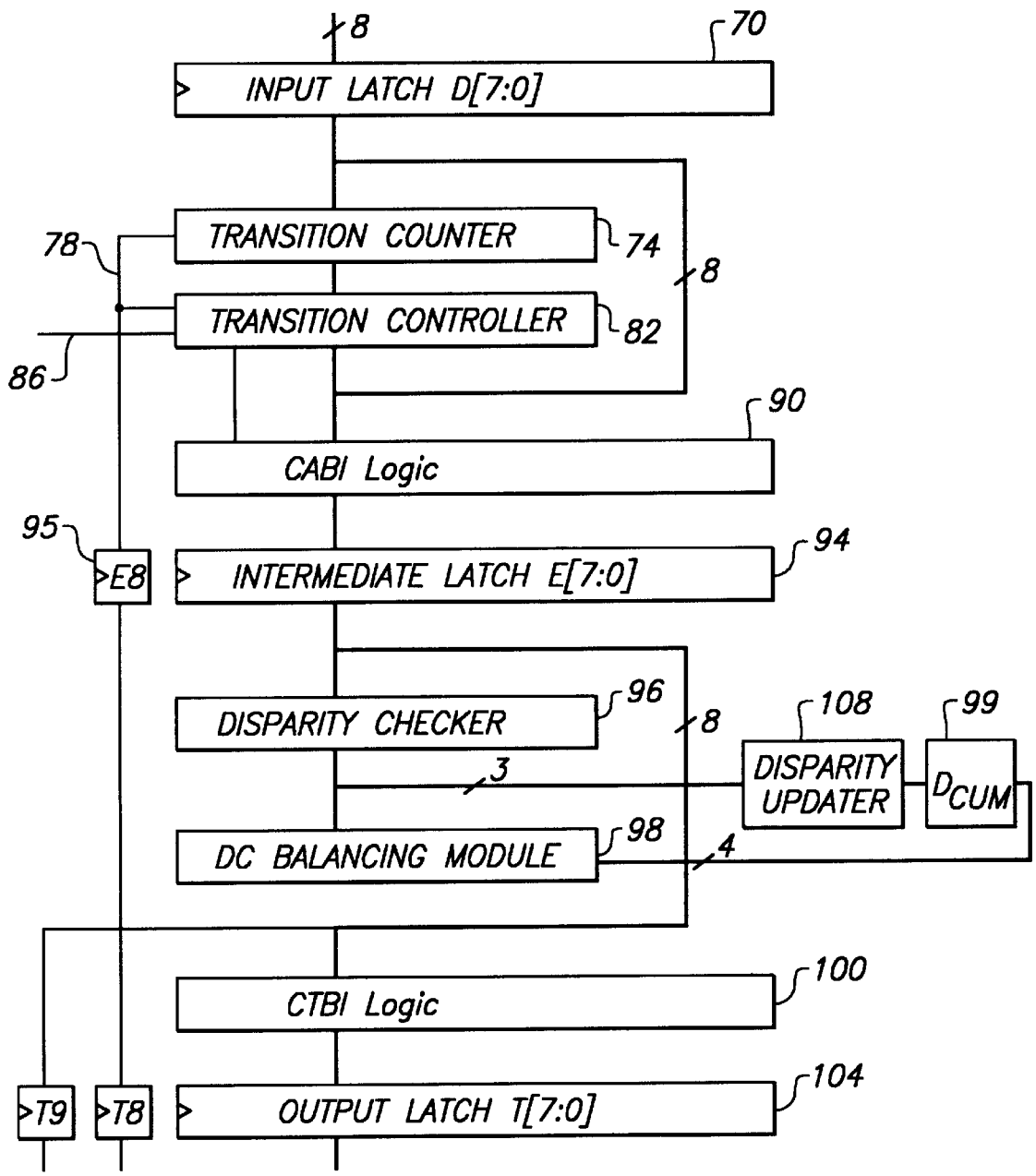
FIG. 2 shows the overall functional organization of a DC-balanced encoder of the present invention in the form of a data flow chart.

Referring now to FIG. 2, the overall functional organization of the transition-controlled DC-balanced encoder 18 of the present invention is shown in the form of a data flow chart. In FIG. 2, the 8-bit parallel data 14 to be encoded is latched within an input latch 70 comprised of, for example, eight D-type flip-flops. A transition counter 74 is operative to count the number of transitions (T) in logical value between adjacent bits of each byte of parallel data 14 within latch 70. If $D_7$, $D_6$, . . . $D_0$, (i.e., D[7:0] comprise the eight bits of data latched within the input latch 70, then the transition counter 74 may determine T as follows:

$$T: (D_7 \text{ xor } D_6)+(D_6 \text{ xor } D_5)+(D_5 \text{ xor } D_4)+(D_4 \text{ xor } D_3)+(D_3 \text{ xor } D_2)+(D_2 \text{ xor } D_1)+(D_1 \text{ xor } D_0)$$

A COUNT line 78 is set to a predefined logical value by counter 74 if more four or more logical transitions are counted between bits of the latched byte (T>3), and is set to the complement of the predefined logical value otherwise (T≦3). In what follows it will be assumed that COUNT=0 if four or more logical transitions are counted by counter 78 (T>3), and that COUNT=1 otherwise (T≦3).

As is indicated by FIG. 2, a transition controller 82 is responsive to COUNT line 78 and to a mode select line 86. Mode select line 86 determines whether encoding is to be performed using the high-transition set or the low-transition set of code characters. When mode select line 86 indicates high-transition encoding is in effect, and COUNT line 78 registers that less than four logical transitions exist within the byte stored within latch 70, the transition controller 82 instructs conditional alternate bit inversion (CABI) logic 90 to invert the even bits the byte stored within latch 70. The resultant conditionally inverted byte, which will have four or more logical transitions, is stored within intermediate latch 94. Conversely, if high-transition encoding is in effect and four or more logical transitions are counted within the byte stored in the input latch 70, the transition controller 82 causes CABI logic 90 to simply transfer the byte from latch 70 (without bit inversion) to the intermediate latch 94. Accordingly, during high-transition encoding mode, if T<4, then E[8:0]='1' $D_7\overline{D}_6D_5\overline{D}_4D_3\overline{D}_2D_1\overline{D}_0$, else if T≧4, then E[8:0]='0' $D_7D_6D_5D_4D_3D_2D_1D_0$ where E[7:0] comprise the eight bits stored within the intermediate latch 94, and E[8] comprises the value of COUNT stored within COUNT latch 95.

When mode select line 86 indicates that low-transition encoding has been selected, and COUNT line 78 registers that four or more logical transitions are present within the byte stored within latch 70, the transition controller 82 instructs conditional alternate bit inversion (CABI) logic 90 to invert the even bits the byte stored within latch 70. Otherwise, if low-transition encoding being performed and four or more logical transitions are counted within the byte stored in the input latch 70, the stored byte is simply transferred without bit inversion to the intermediate latch 94. Accordingly, during low-transition encoding mode, if T>3, then E[8:0]='1' $D_7\overline{D}_6D_5\overline{D}_4D_3\overline{D}_2D_1\overline{D}_0$, else E[8:0] ='0' $D_7D_6D_5D_4D_3D_2D_1D_0$ After CABI logic 90 has provided a byte having a number of logical transitions within the appropriate range to latch 94, a DC-balancing process is performed in which the cumulative disparity between complementary logical values within the stream of 10-bit encoded characters produced by the encoder 18. As used herein, the term "cumulative disparity" ($D_{cum}$) denotes the excess of one bits relative to zero bits produced by the encoder 18 subsequent to synchronization being achieved with the decoder 44 in the manner described below. The term "current disparity" ($D_{cur}$) refers to the excess of one bits to zero bits within the byte currently stored within the latch 94, and is determined by disparity checker 96. A DC-balancing module 98 serves to compare the current disparity to the cumulative disparity stored within latch 99. The result of the comparison is then used to determine whether the byte stored within latch 94 is inverted by conditional byte inversion (CTBI) logic 100 during the course of transfer thereof to output register 104. In this way CTBI logic 100 serves to minimize the cumulative disparity associated with the serial stream produced by the encoder 18. The following provides a logical description of the manner in which each of the 10-bit characters T[9:0] in the DC-balanced character stream produced by the encoder are derived from the byte E[7:0] stored within the intermediate latch 94 and the bit E[8] within COUNT latch 95.

The current disparity ($D_{cur}$) is computed by the disparity checker 96 as follows:

$$D_{cur} := \{(E_7 \text{ and } E_6)+(E_5 \text{ and } E_4)+(E_3 \text{ and } E_2)+(E_1 \text{ and } E_0)\}-\{(E_7 \text{ nor } E_6)+(E_5 \text{ nor } E_4)+(E_3 \text{ nor } E_2)+(E_1 \text{ nor } E_0)\}$$

It is noted that during operation in the high-transition mode, $-2 \leq D_{cum} \leq 2$, while during operation in the low-transition mode $-4 \leq DP \leq 4$. Within the DC-balancing module 98, if it is determined that $D_{cur}=0$ or $D_{cum}=0$, then if $E_8$='0' then T[9:0]='1'$E_8\overline{E}_7\overline{E}_6\overline{E}_5\overline{E}_4\overline{E}_3\overline{E}_2\overline{E}_1\overline{E}_0$, and $$D'_{cum}=D_{cum}-D_{cur}$$

else if $E_8$ is not equal to zero, then T[9:0]= '0'$E_8E_7E_6E_5E_4E_3E_2E_1E_0$, and $$D'_{cum}=D_{cum}+D_{cur}$$

where $D'_{cum}$ is the updated cumulative disparity computed by disparity updater 108 and stored thereby within latch 99. Alternately, if the DC-balancing module determines that the most significant bit (MSB) of $D_{cur}$ and the MSB of $D_{cum}$ are not equivalent, then $$T[9:0]='0'E_8E_7E_6E_5E_4E_3E_2E_1E_0, \text{ and}$$

$$D'_{cum}=D_{cum}+D_{cur}-E_8$$

Finally, in all other cases if the MSB of $D_{cur}$ and the MSB of $D_{cum}$ are equivalent, then, then $$T[9:0]='1'E_8\overline{E}_7\overline{E}_6\overline{E}_5\overline{E}_4\overline{E}_3\overline{E}_2\overline{E}_1\overline{E}_0, \text{ and}$$

$$D'_{cum}=D_{cum}-D_{cur}+E_8$$

In this way the cumulative disparity is reduced, and DC balance achieved, through selective inversion of the byte E[7:0] by CBI logic 100 during the course of filling the output latch 104 as T[7:0]. It is observed that the logical value of T[8] is indicative of whether the even bits of byte D[7:0] received at input latch 70 were complemented during generation of the byte E[0:8]. Similarly, the logical value of T[9] indicates whether byte E[7:0] was inverted during transfer to latch 104.

III. Decoding

Referring to FIG. 1, the deserializer 34 receives the sequence of 10-bit characters T[9:0] produced by the encoder and generates 10-bit parallel received data upon bit lines $RX_9, RX_8, \ldots, RX_0$ (i.e., RX[9:0]). This 10-bit parallel received data is provided over bit lines RX[9:0] to the decoder 44, as well as to a decoder synchronization module 114. As is described below in section IV, the synchronization module 114 is operative to ascertain boundaries within the 10-bit parallel received data corresponding to the frame boundaries of the transmitted data (i.e., to T[9:0]). Specifically, synchronization module 114 determines upon which of the bit lines RX[9:0] the deserializer 34 is providing the received bits corresponding to the first bit T[0] of each transmitted byte T[9:0]. Upon making this determination, the synchronization module 114 provides a frame boundary pointer 118 to decoder 44 identifying the one of the bit lines RX[9:0] corresponding to the first bit T[0] of each transmitted 10-bit character T[9:0]. Upon receiving this synchronization information, the decoder 44 is disposed to decode the received data RX[9:0] in the following manner.

Figure 3:
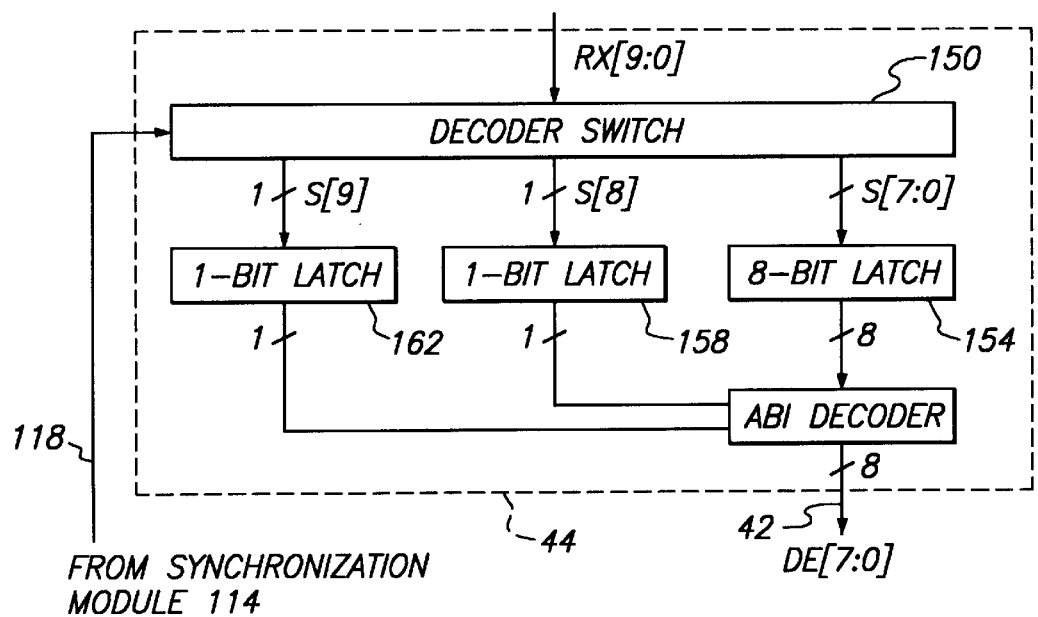
FIG. 3 provides a block diagrammatic representation of a decoder included within the transmission system of FIG. 1.

FIG. 3 provides a block diagrammatic representation of the decoder 44. The 10-bit parallel data produced by the deserializer is seen to be received over bit lines RX[9:0] by a decoder switch 150. The decoder switch 150 serves to switch the 10-bit data received over bit lines RX[9:0] to switched bit lines S[9:0] in accordance with frame boundary pointer value 118 provided by the synchronization module 114. Specifically, the one of the received bits RX[9:0] corresponding to the first transmitted bit T[0] is switched to bit line S[0], the one of the received bits RX[9:0] corresponding to the second transmitted bit T[1] is switch to bit line S[1], and so on. The switched data impressed upon bit lines S[7:0], which corresponds to the transmitted data byte T[7:0], is stored within 8-bit latch 154. Similarly, the switched data bit S[8], which corresponds to the transmitted bit T[8], is provided to 1-bit latch 158. Since the logical value of bit line S[8] tracks the logical value of T[8], the bit line S[8] informs the Alternate Bit Inversion (ABI) decoder 160 as to whether the even bits of the input data D[7:0] were complemented by CABI logic 90 (FIG. 2) during the encoding process. Likewise, the bit line S[9] (which tracks the logical value of T[9]) informs the ABI decoder 160 as to whether CTBI logic 100 complemented the byte stored within latch 104 during the DC-balancing portion of the encoding process. In this way the decoder 160 is informed of the logical operations performed upon the byte S[7:0] stored within 8-bit latch 154 during the encoding process, thereby facilitating straightforward decoding using random logic.

Figure 4:
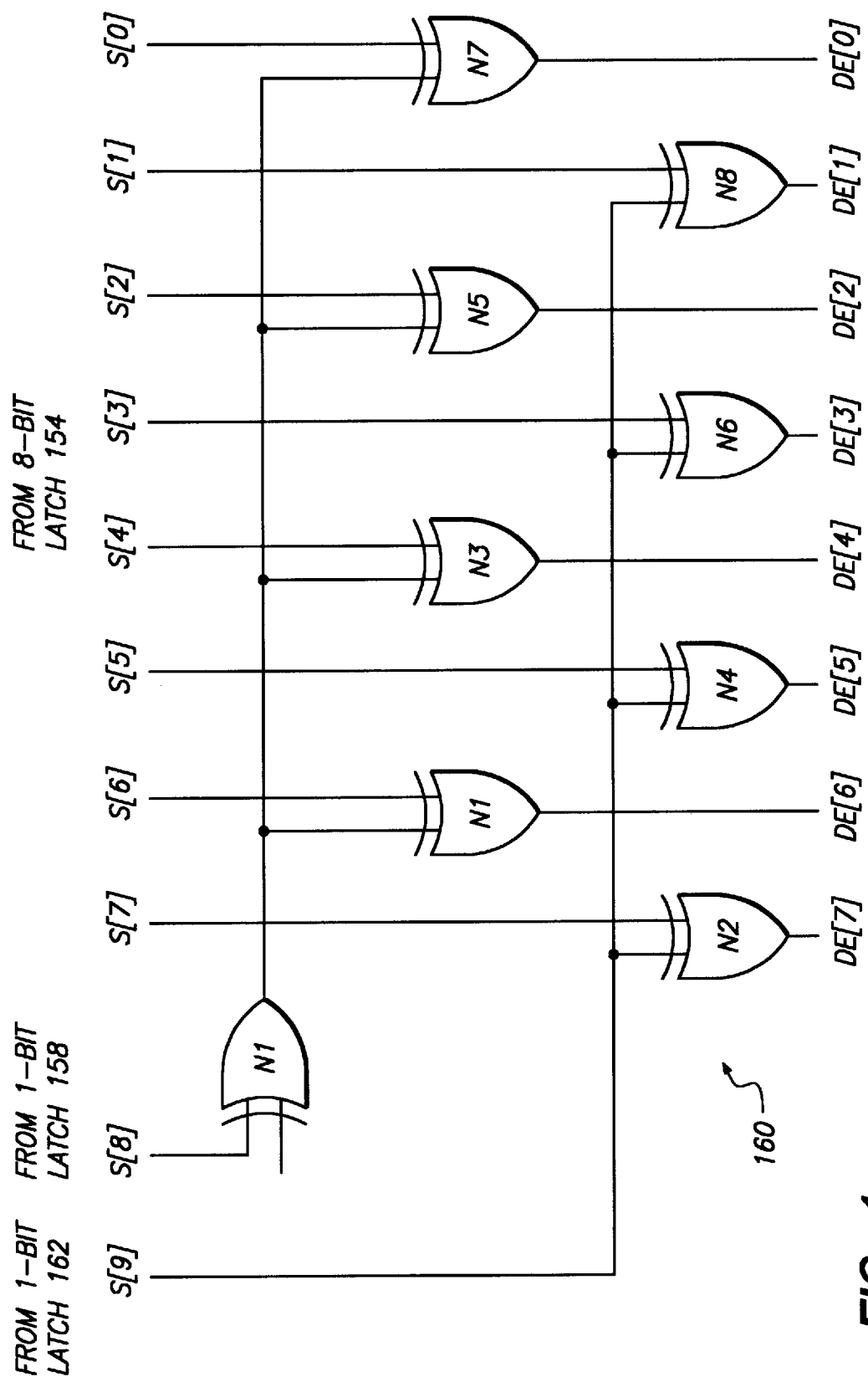
FIG. 4 shows a random logic implementation of an alternate byte inversion decoder module of the decoder of FIG. 3.

Turning now to FIG. 4, there is shown a random logic implementation of the ABI decoder 160. The ABI decoder includes a set of nine exclusive-or (XOR) gates N1–N9 for decoding the 10-bit frame-aligned data S[9:0] in order to produce the 8-bit decoded byte DE[7:0]. In the implementation of FIG. 4, the XOR gates N1–N9 produce the decoded byte DE[7:0] as follows:

DE[7]:=S[7] xor S[9]
DE[6]:=S[6] xor β
DE[5]:=S[5] xor S[9]
DE[4]:=S[4] xor β
DE[3]:=S[3] xor S[9]
DE[2]:=S[2] xor β
DE[1]:=S[1] xor S[9]
DE[0]:=S[0] xor β where f:=S[9] xor S[8].

IV. Synchronization

As mentioned above, the decoder synchronization module 114 provides an indication to the decoder 44 of the frame boundary of each transmitted 10-bit character T[9:0]. The decoder module 114, together with the decoder switch 150 (FIG. 3), effectively function as a barrel-shifter to shuffle the parallel data RX[9:0] from the deserializer into the frame-aligned data S[9:0]. In accordance with the invention, a preamble sequence is produced by the encoder 18 at various times (e.g., at system power-up) in order to facilitate frame boundary detection by the synchronization module 114. In the exemplary embodiment this preamble sequence includes several repetitions of selected out-of-band characters easily distinguishable from in-band characters. Again, during high-transition mode operation each out-of-band character will include less than four logical transitions, and during low-transition mode operation each out-of-band character will includes four or more logical transitions. As is discussed below, during operation in each mode several repetitions of specially selected out-of-band characters are produced by the encoder 18 during the preambling period as a means of ensuring rapid frame boundary identification within the decoder synchronization module 114. At the conclusion of the preambling period, the module 114 will "know" which of the bit lines RX[9:0] corresponds to the first bit T[0] of the 10-bit transmitted character, and will inform decoder via frame boundary pointer 118.

By selecting an appropriate subset of out-of-band characters for transmission during the preambling period, the worst-case time required for synchronization to be achieved may be reduced relative to that required by conventional synchronization schemes. In particular, during low-transition mode operation the following out-of-band characters are used as "synchronization characters".

1100101010
1101001010
1101010010
1101010100

During high-transition mode operation, the following out-of-band characters are used as synchronization characters:

1000001111
1000011111
1000111111
1001111111
1011111111

During each preambling period, three repetitions of the same synchronization character are produced by the encoder 18. As is described herein, by processing the 21 bits most recently produced by the encoder 14, synchronization module 114 is able to detect at least one of the three repetitions of the synchronization character transmitted during a given preambling period. This advantageously allows synchronization to be achieved within a relatively short preambling period.

Figure 5:
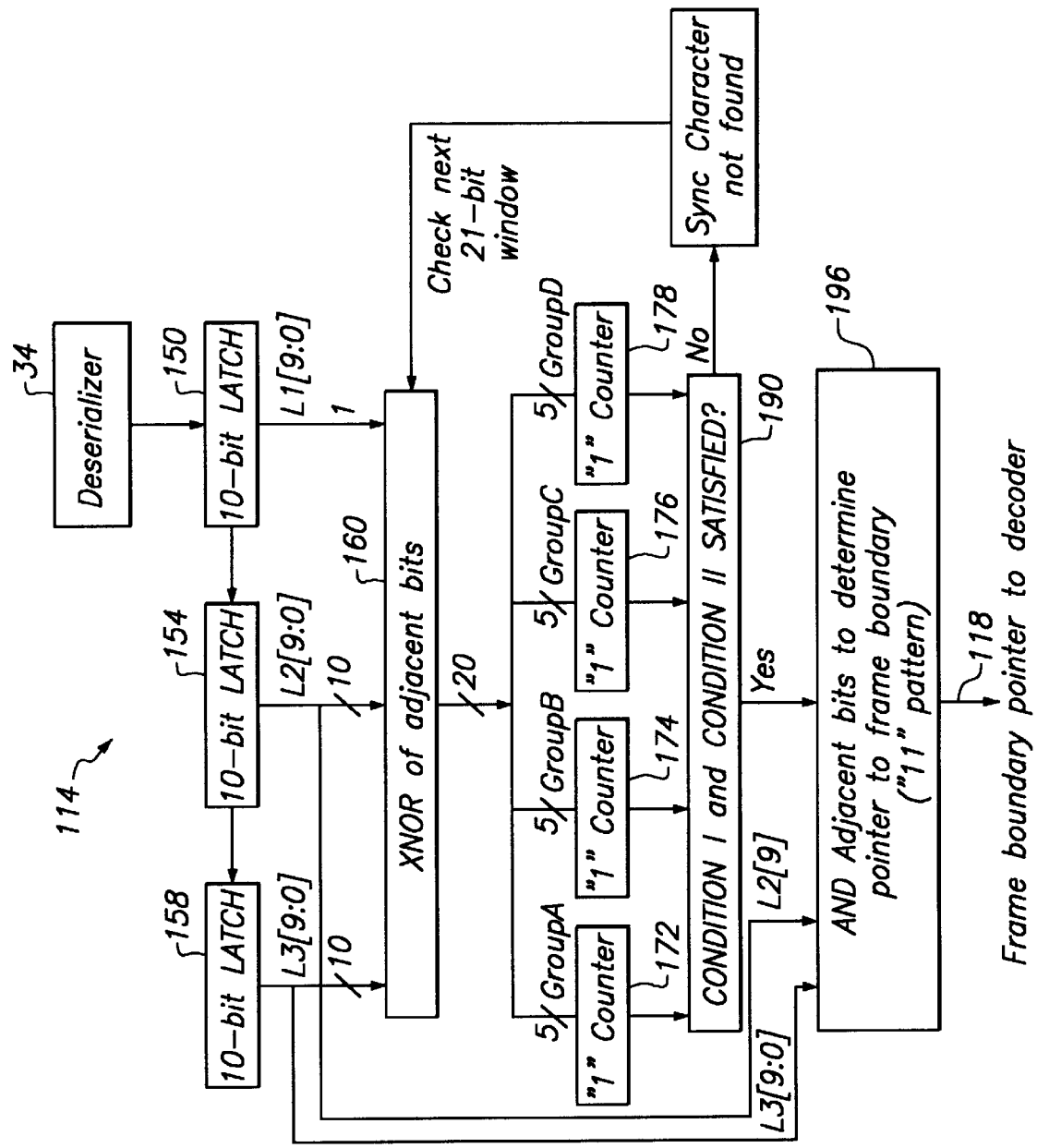
FIG. 5 is a flow chart depicting the synchronization process effected by a decoder synchronization module operative in conjunction with the decoder of FIG. 3.

Turning now to FIG. 5, a flow chart is provided of the synchronization process effected by the decoder synchronization module 114 during low-transition mode operation. During each clock cycle of the module 114, a block of ten bits is loaded from the deserializer 34 into a first 10-bit latch 150. Also during each clock cycle, a 10-bit block is transferred from the first 10-bit latch 150 to a second 10-bit latch 154. Similarly, the 10-bit block currently stored within the second 10-bit latch 154 is transferred during each clock cycle to a third 10-bit latch 158.

As is indicated by FIG. 5, an exclusive-NOR (XNOR) operation (step 162) is performed between adjacent bits included within a 21-bit "window" of data held by the latches 150,154,158. Specifically, this 21-bit window includes a 10-bit block L3[9:0] from the third latch 158, a 10-bit block L2[9:0] from the second latch 154, and the bit L1[9] from the first latch 150. In this regard the bit L1[9] is that bit which becomes bit L2[9] upon being transferred to the second latch 154. As an example of operation during the low-transition mode, consider a 21-bit window (i.e., L3[9:0], L2[9:0], L1[9]) comprised of the following parallel bit sequence:

101101001010110100101

If an XNOR operation is performed between each pair of adjacent bits, the following result is obtained:

00100010000010001000

As is indicated by FIG. 5, this 20-bit result of the XNOR operation (step 160) is divided into four 5-bit groups (i.e., Group A, Group B, Group C and Group D). In the current example, these four 5-bit groups are defined as follows:

00100010000010001000 {Result of XNOR operation}
  00100 {Group A}
    01000 {Group B}
      00100 {Group C}
        01000 {Group D}

The synchronization characters for both the high-transition mode and the low-transition modes enumerated above have been selected such that particular relationships arise between Groups A, B, C and D during the preambling period. That is, when three consecutive occurrences of the same synchronization character—produced by the encoder 18 during preambling—are received by the deserializer 34 and provide as 10-bit parallel data to the synchronization module 114.

In an exemplary implementation, the following two relationships (Condition I and Condition II) arise between Groups A, B, C and D during the preambling period:

Condition I. The number of logical "1's" collectively present in Groups A, B, C, and D is exactly four, and corresponds to one of the following three cases:

| | Number of Logical 1's | | | |
|---|---|---|---|---|
| Case | Group A | Group B | Group C | Group D |
| #1 | 1 | 1 | 1 | 1 |
| #2 | 2 | 0 | 2 | 0 |
| #3 | 0 | 2 | 0 | 2 |

As is indicated by FIG. 5, the number of "1's" in each of the Groups A, B, C and D are determined by "1" counter modules 172, 174, 176 and 178, respectively. Since the number of "1's" within each Group A, B, C and D is determined by the results of the XNOR operation between adjacent bits in the 21-bit window (step 160), the number of "1's" within each group is indicative of the number of "non-transitions" in logical value between adjacent bits in each of four segments of the 21-bit window associated with Groups A, B, C and D. In the current example, it is seen that each of Groups A, B, C and D each include a single "1". Accordingly, the current example corresponds to Case #1.

Condition II. The sequence of bits comprising Group A is equivalent to the bit sequence of Group C, and the sequence of bits comprising Group B is equivalent to the bit sequence of Group D. That is, Group A=Group C, and Group B=Group D.

In accordance with the invention, both Condition I AND Condition II are satisfied if and only if the same synchronization character is stored within the first, second and third 10-bit latches 150, 154 and 158. That is, both Condition I and Condition II are satisfied only during the preambling period, when three repetitions of the same synchronization character are produced by the encoder 18. This aspect of the invention is explained immediately below with reference to low-transition mode operation.

As was described above, the adjacent bits within a 21-bit window provided by latches 150, 154 and 158 are XNOR'ed during step 160 (FIG. 5). Because each in-band or out-of-band character produced by the encoder 18 is exactly ten bits in length, the 21-bit window will include all or part of $1^{st}$, $2^{nd}$ and $3^{rd}$ 10-bit characters. The various ways in which the 21-bit window may include bits from these $1^{st}$, $2^{nd}$ and $3^{rd}$ 10-bit characters is set forth below:

| | # Of Bits | | |
|---|---|---|---|
| | 1st Character | 2nd Character | 3rd Character |
| 1 | 1 | 10 | 10 |
| 2 | 2 | 10 | 9 |
| 3 | 3 | 10 | 8 |
| 4 | 4 | 10 | 7 |
| 5 | 5 | 10 | 6 |
| 6 | 6 | 10 | 5 |
| 7 | 7 | 10 | 4 |
| 8 | 8 | 10 | 3 |
| 9 | 9 | 10 | 2 |
| 10 | 10 | 10 | 1 |

Since each character is either an in-band (e.g., DATA) character or an out-of-band command or synchronization (i.e., SYNC) character, the following sets forth the possible combinations of DATA and SYNC characters among the $1^{st}$, $2^{nd}$ and $3^{rd}$ 10-bit characters contributing to the 21-bit window:

| Combination | 1st Character | 2nd Character | 3rd Character |
|---|---|---|---|
| A | SYNC | SYNC | SYNC |
| B | SYNC | SYNC | DATA |
| C | SYNC | DATA | DATA |
| D | DATA | DATA | DATA |
| E | DATA | DATA | SYNC |
| F | DATA | SYNC | SYNC |

For example, 21-bit window could be comprised of two bits of a $1^{st}$ SYNC Character, ten bits of a $2^{nd}$ DATA Character, and nine bits of a $3^{rd}$ DATA Character (i.e., Combination C).

During low-transition mode operation, all in-band (e.g., DATA) characters include a maximum of three logical transitions or, equivalently, more than four "non-transitions" in logical value between the ten adjacent bits of the in-band character. Accordingly, during low-transition mode operation if the $2^{nd}$ character is a DATA character, it will include more than four logical non-transitions. Since Condition I indicates that the number of logical non-transitions within the entire 21-bit window will be exactly four when three identical SYNC characters are present therein, Condition I will not be satisfied when the $2^{nd}$ character is a DATA character since it would include more than four logical non-transitions. Hence, if Condition I is to be satisfied then the 21-bit window cannot be comprised of the character sets specified by Combinations C, D and E (i.e., $2^{nd}$ character is a DATA character).

In accordance with the invention, the synchronization characters listed above have been chosen such that Condition II will be satisfied if the $1^{st}$ and $3^{rd}$ characters transmitted during any preamble period are identical. Hence, Combination B and F do not satisfy Condition II. It follows that only Combination A (i.e., three consecutive SYNC characters) satisfies both conditions I and II.

Referring to FIG. 5, if both Condition I and Condition II are satisfied (step 190) then selected adjacent bits within Groups A and B are AND'ed (step 196) as described below in order to identify the frame boundaries of the SYNC characters detected within the 21-bit window. Since each SYNC character within the 21-bit window is loaded by the deserializer 34 into latch 150, the frame boundary of each SYNC character may be identified in terms of the one of the bit lines R[9:0] from the deserializer 34 upon which the first bit of each such SYNC character is impressed. Once this identification is achieved, the decoder is informed of the identity of this bit line R[9:0] by way of frame boundary pointer 118.

The AND operation of step 196 is performed between all of the adjacent bits in the third latch 158 (i.e., L3[9:0]), as well as between L3[0] and L2[9]. When the result of step 190 has indicated that both Condition I and Condition II are satisfied, the result of the AND operation of step 196 will produce only a single logical one indicative of the value of the frame boundary pointer 118. In the current example, L3[9:0]:={1011010010} and L2[9]:=[1], and thus the result of the AND operation of step 196 is {0010000000}. That is, the third position in the 21-bit window corresponds to the first bit of a synchronization Character. Accordingly, in the current example the frame boundary pointer 118 would be set so as to identify the third (RX[7]) of the ten bit lines RX[9:0] as carrying the first bit of each 10-bit character produced by the deserializer 34.

In the exemplary embodiment a preambling sequence (i.e., three repetitions of the same out-of-band SYNC character) is sent upon system power-up as well as during lapses in data transmission over the serial link 30. This allows timing synchronization to be maintained between the encoder 18 and decoder 44 even in the absence of data transmission for extended periods.

Figure 6:
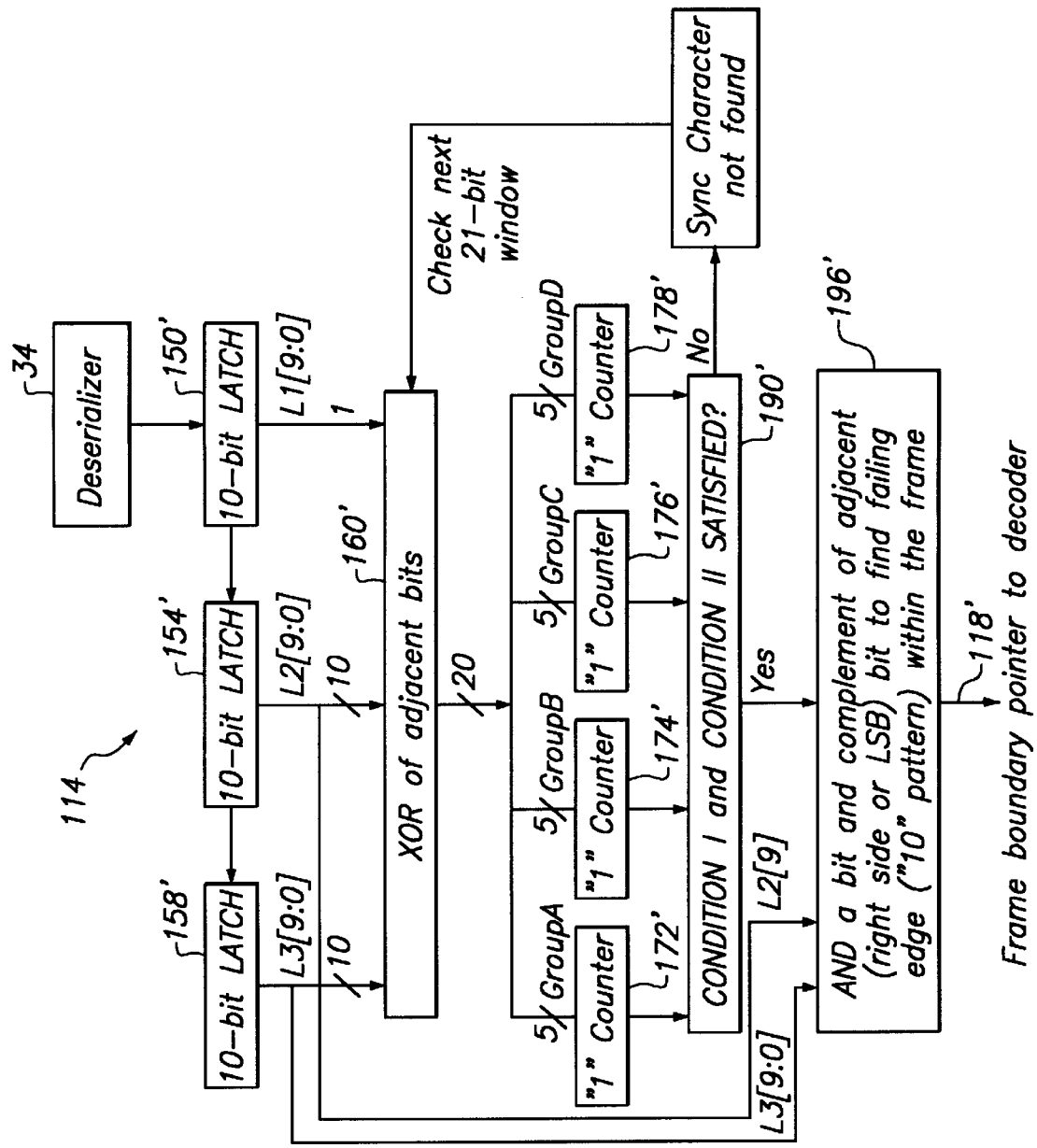
FIG. 6 is a flow chart depicting the synchronization process effected by the decoder synchronization module during high-transition mode operation.

FIG. 6 is a flow chart depicting the synchronization process effected by the decoder synchronization module 114 during high-transition mode operation. As is indicated by FIG. 6, the high-transition mode synchronization process is substantially similar to that performed during low-transition mode operation (FIG. 5). In particular, the high-transition mode synchronization process differs from the low-transition mode synchronization process primarily in that:

(i) In step 160', an exclusive-OR (XOR) rather than an exclusive-NOR (XNOR) operation is performed upon adjacent bits within the latches 150', 154' and 158'.

(ii) In step 196', an AND operation is performed between each bit and the complement of the bit immediately to the right (e.g., L3[9] AND L3[8], L3[8] AND L3[7], L3[7] AND L3[6], and so on. In this way the AND gate producing a logical "1" identifies a "10" or "falling edge" sequence corresponding to the frame boundary.

V. Hardware Implementations of Encoder and Decoder Synchronization Module

In this section a description is provided of a specific hardware implementation of the encoder 18, and of an implementation of the decoder synchronization module 114 suitable for use during low-transition mode operation. A description of an exemplary hardware realization of the decoder 44 in random logic was provided above in section III.

Figure 7A:
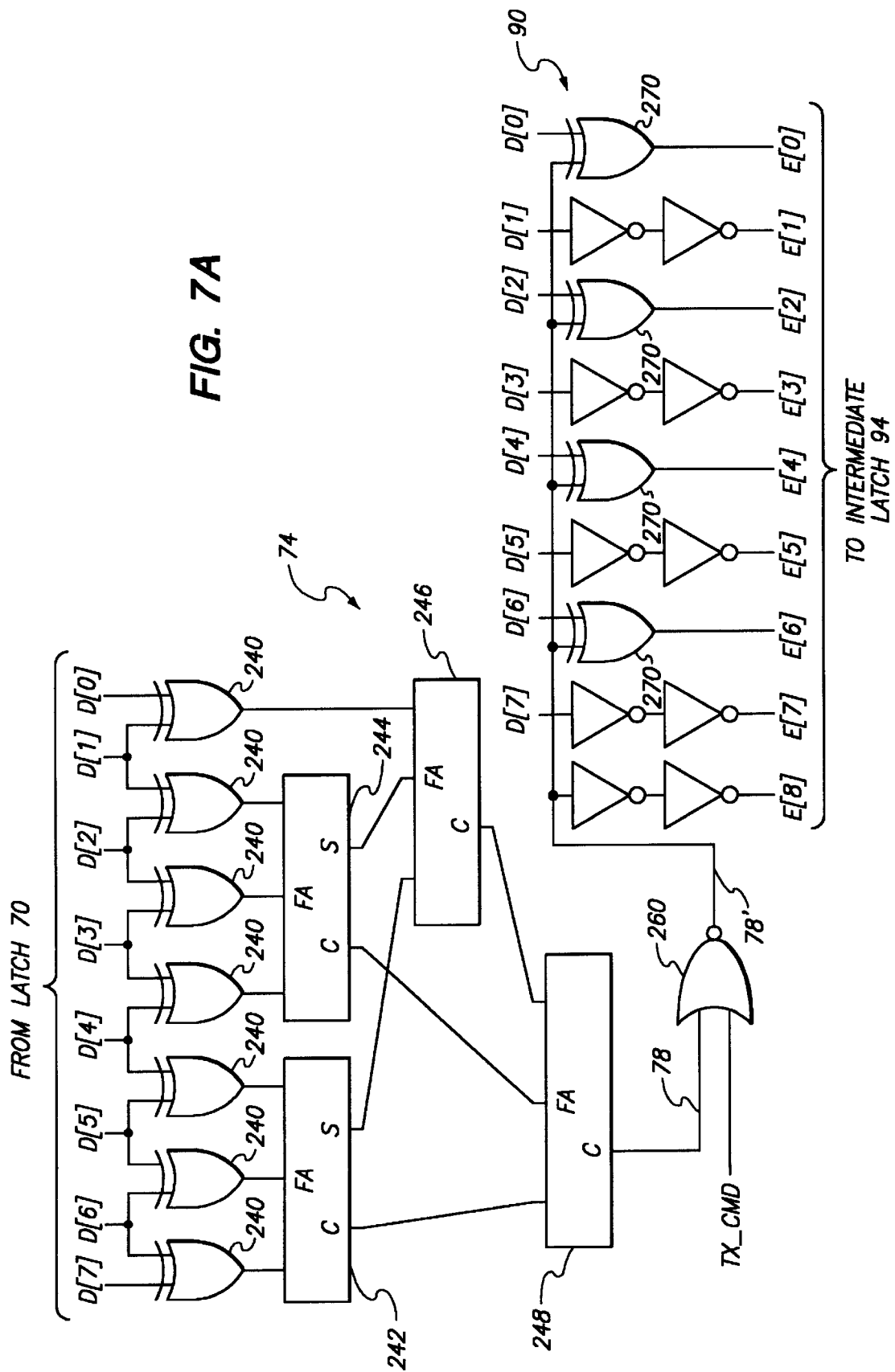
FIGS. 7A and 7B provide a schematic representation of an exemplary implementation of the encoder.
Figures 2, 7B:
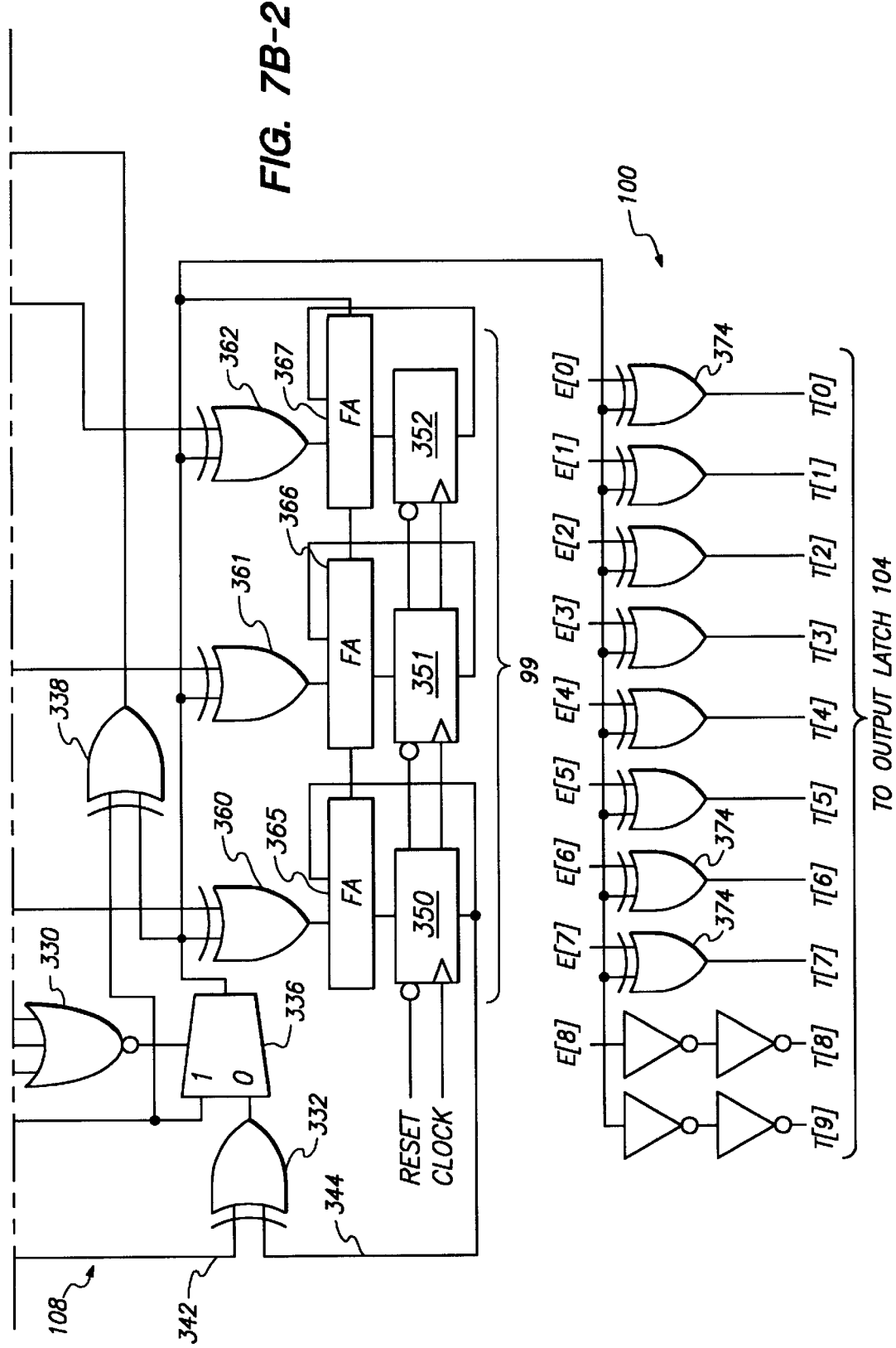

FIGS. 7A and 7B provide a schematic representation of an exemplary implementation of the encoder 18. The 8-bit parallel data D[7:0] from latch 70 to be encoded is seen to be provided to seven exclusive-OR gates 240 of the transition counter 74. The outputs of the exclusive-OR gates 240 are provided to a set of full-adders 242, 244, 246 and 248. The carry output (C) of the full-adder 248 corresponds to the COUNT line 78, and indicates whether less than four logical transitions exist between the bits in the data D[7:0]. When an out-of-band command is being received from latch 70, a command line (TX_CMD) provided to NOR gate 260 is raised so as to prevent the COUNT line 78 from causing inversion of the even bits of D[7:0] within CABI logic 90. Otherwise, when the data D[7:0] from latch is being encoded in accordance with the invention, the output 78' of NOR gate 260 tracks the logical value of COUNT line 78.

As is indicated by FIG. 7A, in the exemplary embodiment CABI logic 90 is comprised of a plurality of NOR gates 270. Each NOR gate 270 includes one input coupled to COUNT line 78', and another input connected to one of the even bits of D[7:0]. The output of CABI logic 90 is provided to intermediate latch 94, which is coupled to the input of disparity checker 96 (FIG. 7B).

Turning to FIG. 7B, the disparity checker 96 includes four AND gates 290–293 for determining occurrences of "11" within the conditionally bit-inverted byte E[7:0]. Similarly, four NOR gates 296–299 are provided for detecting occurrences of "00" within E[7:0]. Since pattern of "01" and "01" within E[7:0] are already "DC-balanced" in the sense of including equal numbers of ones and zeroes, there exists no need to detect such patterns during the DC-balancing process effected by the circuitry of FIG. 7B. A first fall-adder 302 and first half-adder 306 are disposed to count the occurrences of "11" detected by AND gates 290–293. In like manner a second full-adder 308 and second half-adder 312 are provided for counting the occurrences of "00" detected by the NOR gates 296–299. A first pair of full-adders 316 and 318 determine the difference in the counted occurrences of "11" and "00".

The DC-balancing module 98 includes a three-input NOR gate 330, a first exclusive-OR gate 332, a latch 336 and a second exclusive-OR gate 338. When the occurrences of "11" and "00" are determined to be equivalent by full-adders 316 and 318, the complement of E[8] determines the value of T[9], and hence whether the byte E[7:0] is inverted by CTBI logic 100. When the counted occurrences of "00" and "11" are not equivalent, the value of T[9] comprises the output of XOR gate 332. In this regard a first input 342 to XOR gate 332 comprises the most significant bit (MSB) produced by the pair of full-adders 316 and 318, which is equivalent to the MSB of the current disparity $D_{cur}$ (i.e., the difference in "1's and "0's" in E[7:0]). A second input 344 to XOR gate 332 corresponds to the MSB of the cumulative disparity $D_{cum}$. As is indicated by FIG. 7B, the latch 99 for storing the cumulative disparity is comprises of three registers 350–352. The cumulative disparity is updated by a disparity updater 108 comprised of a backward chain of full adders 356 and 358, a set of three exclusive-OR gates 360–362, and a corresponding set of three full-adders 365–367. Finally, CTBI logic 100 includes a set of eight exclusive-OR gates 374.

Figure 8A:
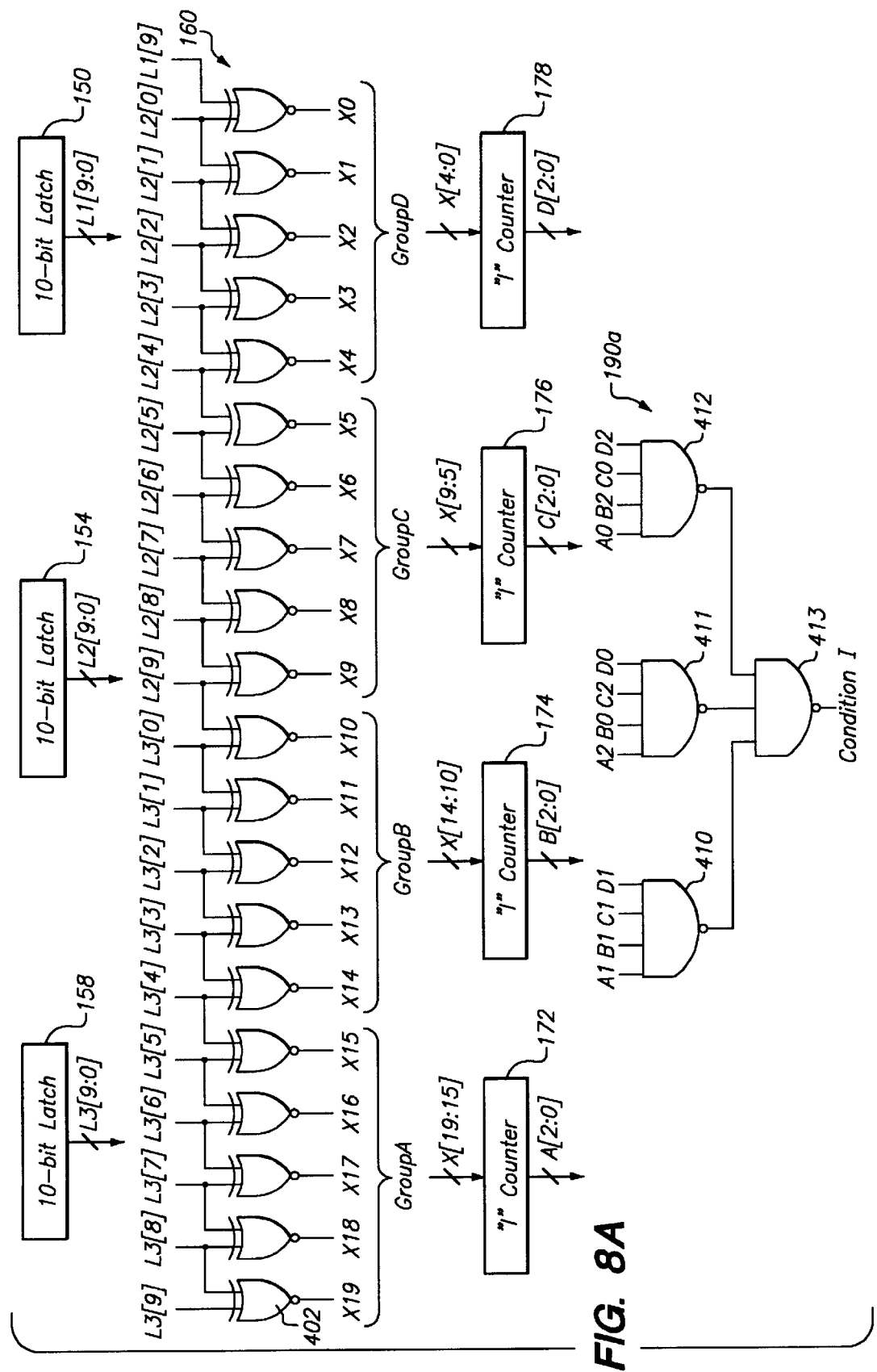
FIGS. 8A and 8B provide a schematic representation of a preferred implementation of the decoder synchronization module.
Figure 8B:
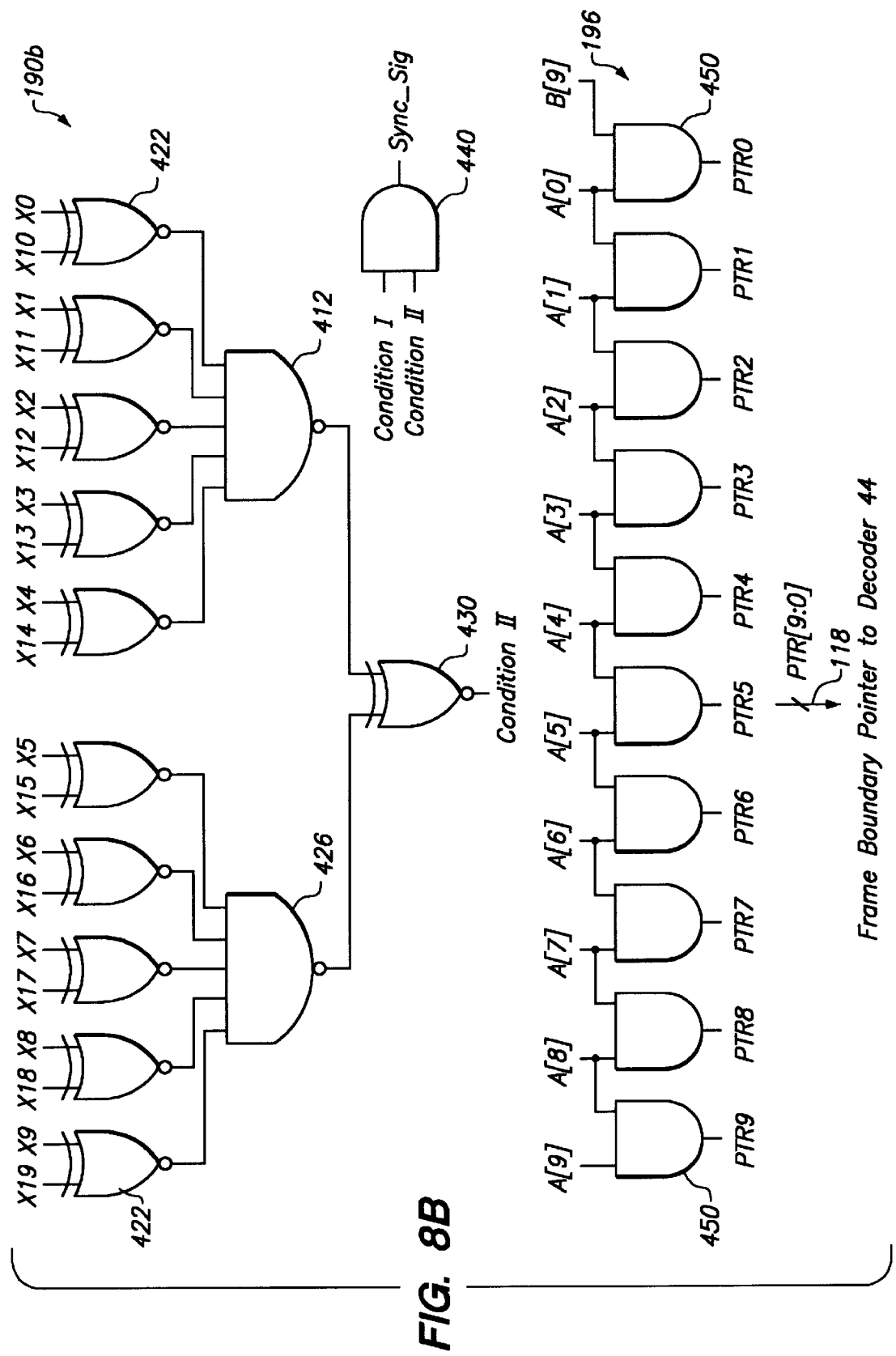

FIGS. 8A and 8B provide a schematic representation of a preferred implementation of the decoder synchronization module 114. In FIG. 8A, the 10-bit latches 150, 154 and 158, for storing L3[9:0], L2[9:0] and L1[9:0], respectively, may each be realized using an array of ten D-type flip-flops. A plurality of XNOR gates 402 are provided for XNOR'ing adjacent bits included within the 21-bit window corresponding to L3[9:0], L2[9:0] and l1[9]. The Group A, Group B, Group C, and Group D outputs of the XNOR gates 402 are then respectively provided to the "1" counters 172, 174, 176 and 178. As is indicated by FIG. 8A, the existence of Condition I is detected by random logic 190a, which is comprised of four NAND gates 410–413.

Turning now to FIG. 8B, the existence of Condition II is identified by an arrangement of random logic identified by reference numeral 190b. Random logic 190b includes a set of ten XOR gates 422, the outputs of which are provided as shown to NAND gates 426 and 428. The outputs of NAND gates 426 and 428 are coupled to the inputs of a NOR gate 430, the output of which is driven to a logical "1" when Condition II is satisfied. Finally, the logical state of the output (Sync_Sig) of an AND gate 440 is indicative as to whether Condition I and Condition II have been satisfied (i.e., as to whether synchronization has been achieved). If so, adjacent bits within L3[9:0] and L2[9] are AND'ed (step 196 of FIG. 5) by a set of ten AND gates 450. The outputs PTR[9:0] comprise the frame boundary pointer 118, which informs decoder 44 as to which of the bit lines RX[9:0] correspond to the first bit T[0] of each transmitted 10-bit character T[9:0].

VI. Alternate Embodiments

Transition optimization based on 1-bit count

Figure 9A:
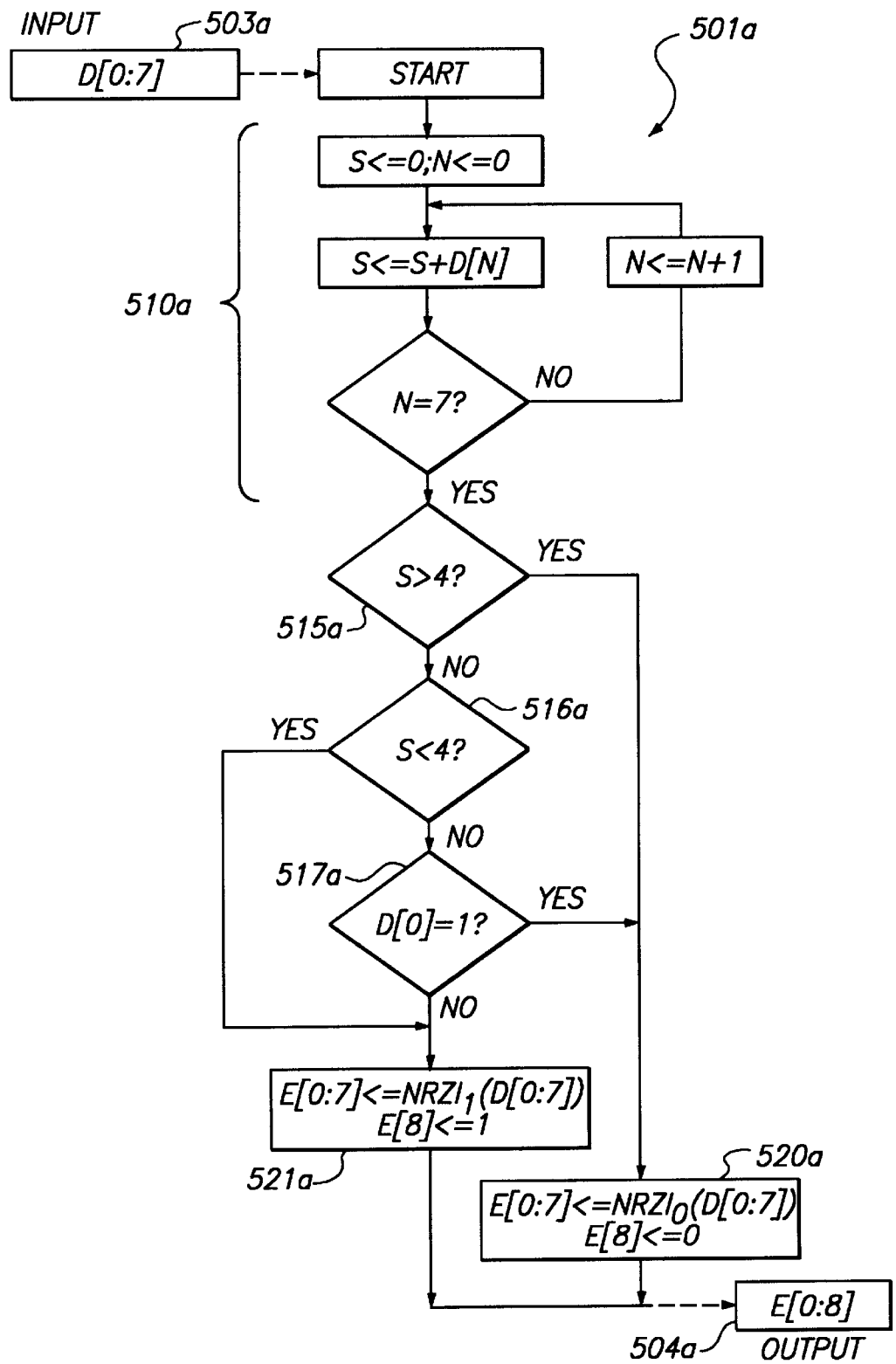
FIGS. 9A and 9B provide a flowchart representation of an alternative embodiment of a transition optimizer.
Figure 9B:
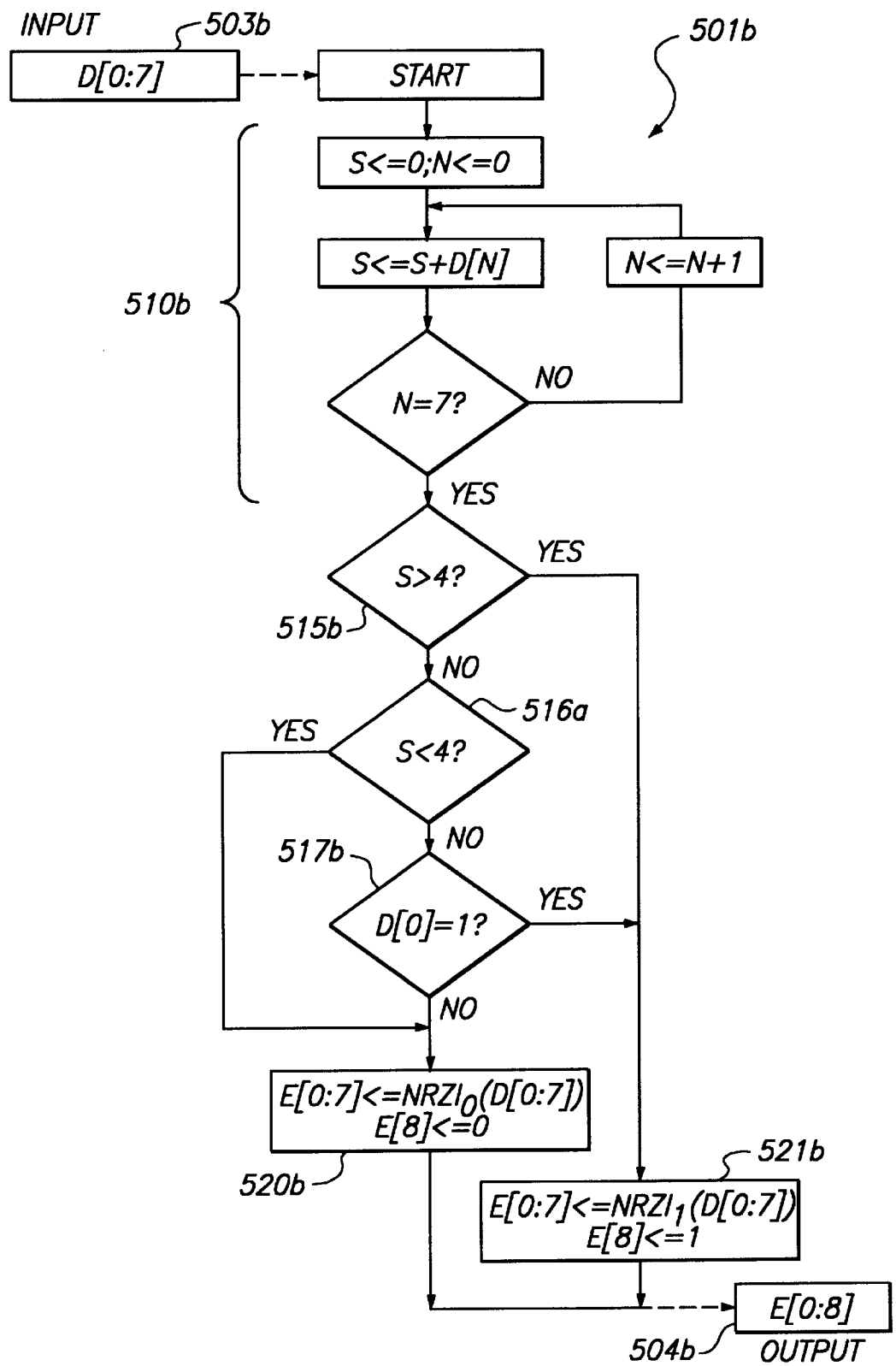

FIGS. 9A and 9B are flowcharts depicting an alternative encoding technique for producing a transition-optimized signal stream.

Referring to the flowchart of FIG. 9A, during a transition minimization step 501a an input frame of data, such as the 8-bit frame D[0:7] 503a, is processed as described below. Specifically, in step 510a, the number of bits set to in "1" in frame 503a are counted. The count value is depicted in the flowchart as "S". In step 515a, the count is compared to a predetermined threshold value that represents one-half of the frame size. Thus, for an 8-bit frame, the count is compared to the value 4.

If the count value exceeds 4, in Step 520a a 9-bit transition-minimized frame is formed by performing a $NRZI_0$-encoding operation over 8-bit frame D[0:7] and prepending a '0' bit in order to form transition-minimized frame E[0:8] 504a. The $NRZI_0$-encoding operation consists in part of setting the low-order bit E[0] of frame 504a to the value of the high-order D[0] bit of frame 503a. In addition, each bit E[1] through E[7] in frame 504a is obtained by performing an XNOR operation using the corresponding bit in D[1] through D[7] in frame 503a and the next-higher order bit, and finally by prepending a binary '0'. That is, to produce an $NRZI_0$-encoded 9-bit frame from an unencoded 8-bit frame:

E[0]<=D[0]
E[1]<=D[0] XNOR D[1]
E[2]<=D[1] XNOR D[2]
. . .
E[6]<=D[5] XNOR D[6]
E[7]<=D[6] XNOR D[7]
E[8]<='0'

If the count value derived in Step 510a is less than 4, in Step 521 a 9-bit transition-minimized frame is formed by performing a $NRZI_1$-encoding operation over 8-bit frame D[0:7] 503a and prepending a '1' bit to form transition-minimized frame E[0:8] 504a. The $NRZI_1$-encoding consists of setting the low-order bit E[0] of frame 504a to the value of the high-order D[0] bit of frame 503a. Moreover, each bit E[1] through E[7] is set to a value determined by performing an XOR operation using the corresponding bit D[1] through D[7] in frame 503a and the next-higher-order bit, and finally by prepending a binary '1'. That is, to produce an $NRZI_1$-encoded 9-bit frame from an unencoded 8-bit frame:

E[0]<=D[0]
E[1]<=D[0] XOR D[1]
E[2]<=D[1] XOR D[2]
. . .
E[6]<=D[5] XOR D[6]
E[7]<=D[6] XOR D[7]
E[8]<='1'

If the count value derived in Step 510a is equal to 4, then in Step 517a the value of D[0] is used to select whether transition-minimized frame 504a is formed by $NRZI_0$-encoding or $NRZI_1$-encoding. If D[0] is equal to '1', transition-minimized frame 504a is formed by $NRZI_0$-encoding frame 503a in Step 520a. If D[0] is equal to '0', transition-minimized frame 504a is formed by $NRZI_1$-encoding frame 503a in Step 521.

FIG. 9B depicts a flowchart of an encoding process or producing a transition-maximized signal stream. The transition-maximization process 501b of FIG. 9B is similar to the transition-minimization process of FIG. 9A, except that the positions of the $NRZI_0$-encoding and $NRZI_1$-encoding blocks are swapped.

In step 510b, the number of bits in 8-bit frame D[0:7] which are set to "1" are counted. The count value is depicted in the flowchart of FIG. 9B as "S". In step 515b, the count is compared to a predetermined threshold value that represents one-half of the frame size. Thus, for an 8-bit frame, the count is compared to the value 4.

If the count value exceeds 4, In Step 521b a 9-bit transition-maximized frame is created by performing a $NRZI_1$-encoding operation over 8-bit frame D[0:7] 503a and prepending a '1' bit, thereby forming transition-maximized frame E[0:8] 504b. The $NRZI_1$-encoding consists of setting the low-order bit E[0] of frame 504b to the value of the high-order D[0] bit of frame 503b, and setting each bit E[1] through E[7] to a value determined by XOR'ing the corresponding bit D[0:7] in frame 501b and the next-higher-order bit. A binary '1' is then prepended to the resulting set of bits.

If the count value derived in Step 510b is less than 4, in Step 520b a 9-bit transition-maximized frame is formed by performing a $NRZI_0$-encoding operation over 8-bit frame D[0:7] and prepending a '0' bit to form transition-maximized frame E[0:8] 504b. The $NRZI_0$-encoding consists of setting the low-order bit E[0] of frame 504b to the value of the high-order D[0] bit of frame 503b, and setting each bit E[1] through E[7] to a value determined by XOR'ing the corresponding bit D[0:7] in frame 501b and the next-higher-order bit. A binary '0' is then prepended to the resulting set of bits.

If the count value derived in Step 510b is equal to 4, Step 517b selects whether transition-maximized frame 504b is formed by $NRZI_0$-encoding or $NRZI_1$-encoding depending on the value of D[0]. If D[0] is equal to '1', transition-maximized frame 504b is formed by $NRZI_1$-encoding frame 503b in Step 521b. If D[0] is equal to '0', transition-maximized frame 504b is formed by $NRZI_0$-encoding frame 503b in Step 520b.

Figure 10:
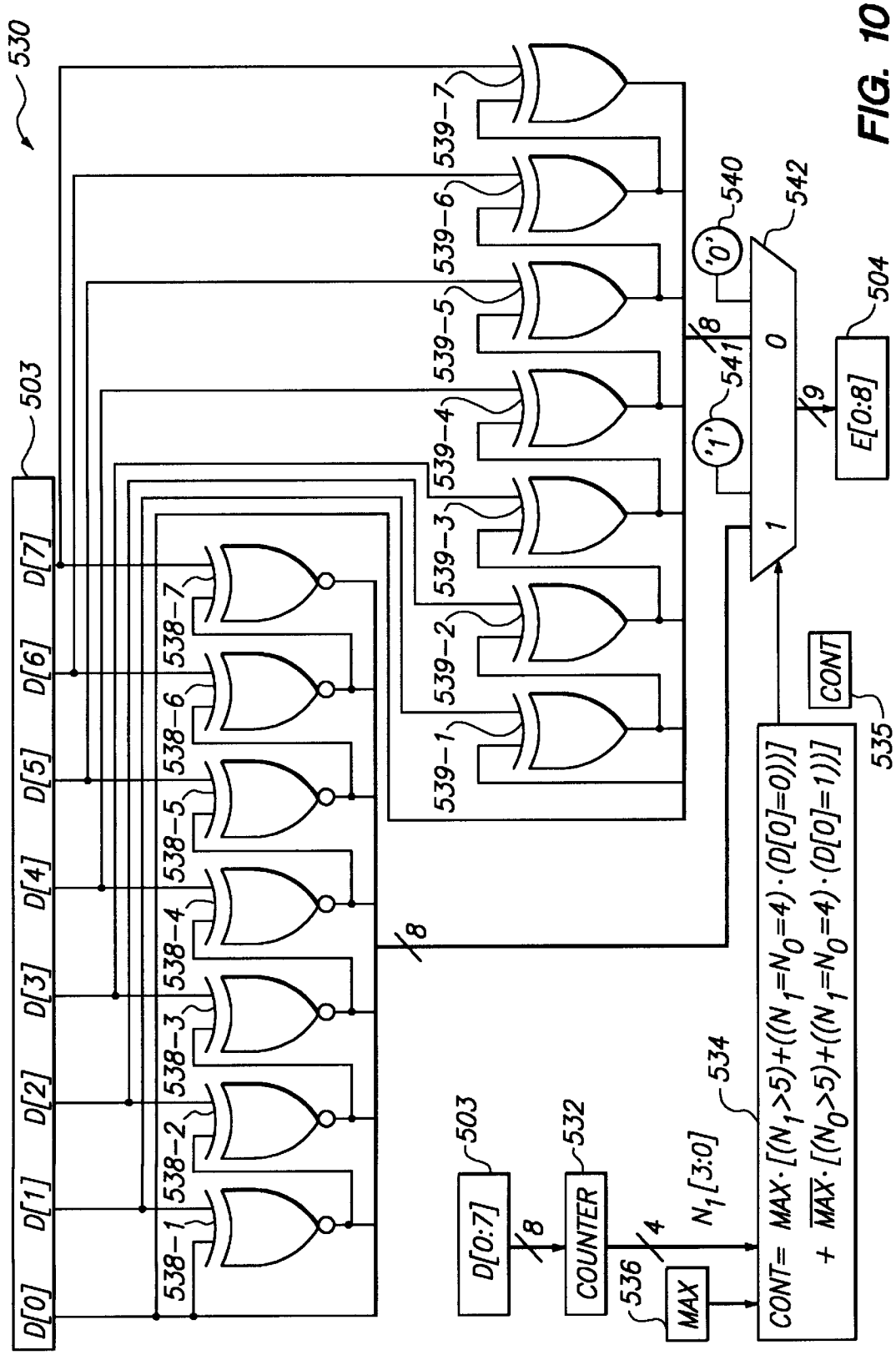
FIG. 10 depicts a logic circuit that implements the transition optimizer of FIGS. 9A and 9B.

FIG. 10 depicts a logic circuit 530 that implements the transition optimization operations of FIGS. 9A and 9B. As shown in FIG. 10, 8-bit frame 503 is presented to counter 532. Counter 532 calculates the number ($N_1$) of '1' bits and the number ($N_0$) of '0' bits (not shown) in frame 503, and presents these counts to mode selector 534. Mode selector 534 calculates two logical values. The first logical value represents the conditions 515b, 516b and 517b used in selection of the $NRZI_0$-encoding step 520b of transition-maximizer 501b, and is represented by the logical value $$[(N_1 .GE. 5)+((N_1 .EQ. N_0 .EQ. 4) \times (D[0] .EQ. 0))].$$

The second logical value represents the conditions 515a, 516a and 517a used in selection of the $NRZI_0$-encoding step 520a of transition-maximizer 501a, and is represented by the logical value $$[(N_0 .GE. 5)+((N_1 .EQ. N_0 .EQ. 4) \times (D[0] .EQ. 1))].$$

Mode-selection signal 536 (labeled "MAX") is selectively set to '0' to select transition-minimized optimization, or is set to '1' to select transition-maximized optimization. Mode selector 534 uses MAX to select one of the two calculated logic values, which results in control signal 535 (labeled "CONT") selecting between $NRZI_0$ and $NRZI_1$ encoding.

8-bit frame 503 is presented as input to an array of XNOR gates 538-1 through 538-7, and also to an array of XOR gates 539-1 through 539-7. XNOR gates 538-1 through 538-7 perform $NRZI_0$ encoding over frame 503 and present the resulting signals, along with '1' bit 541, as input to selector 542. XOR gates 539-1 through 539-7 perform $NRZI_1$ encoding over frame 503 and present the resulting signals, along with '0' bit 540, as input to selector 542. Selector 542 selects between the $NRZI_0$-encoded signal and $NRZI_1$-encoded signal in accordance with control signal 535, and produces as output the 9-bit transition-optimized signal 504 E[0:8]. The transition-optimized signal thus formed may be decoded using the same general method and apparatus discussed in connection with FIGS. 3 and 4, above.

Frame-wise DC-balancing using a Frame Synchronous Scrambler for 8B/9B coding.

Figure 11:
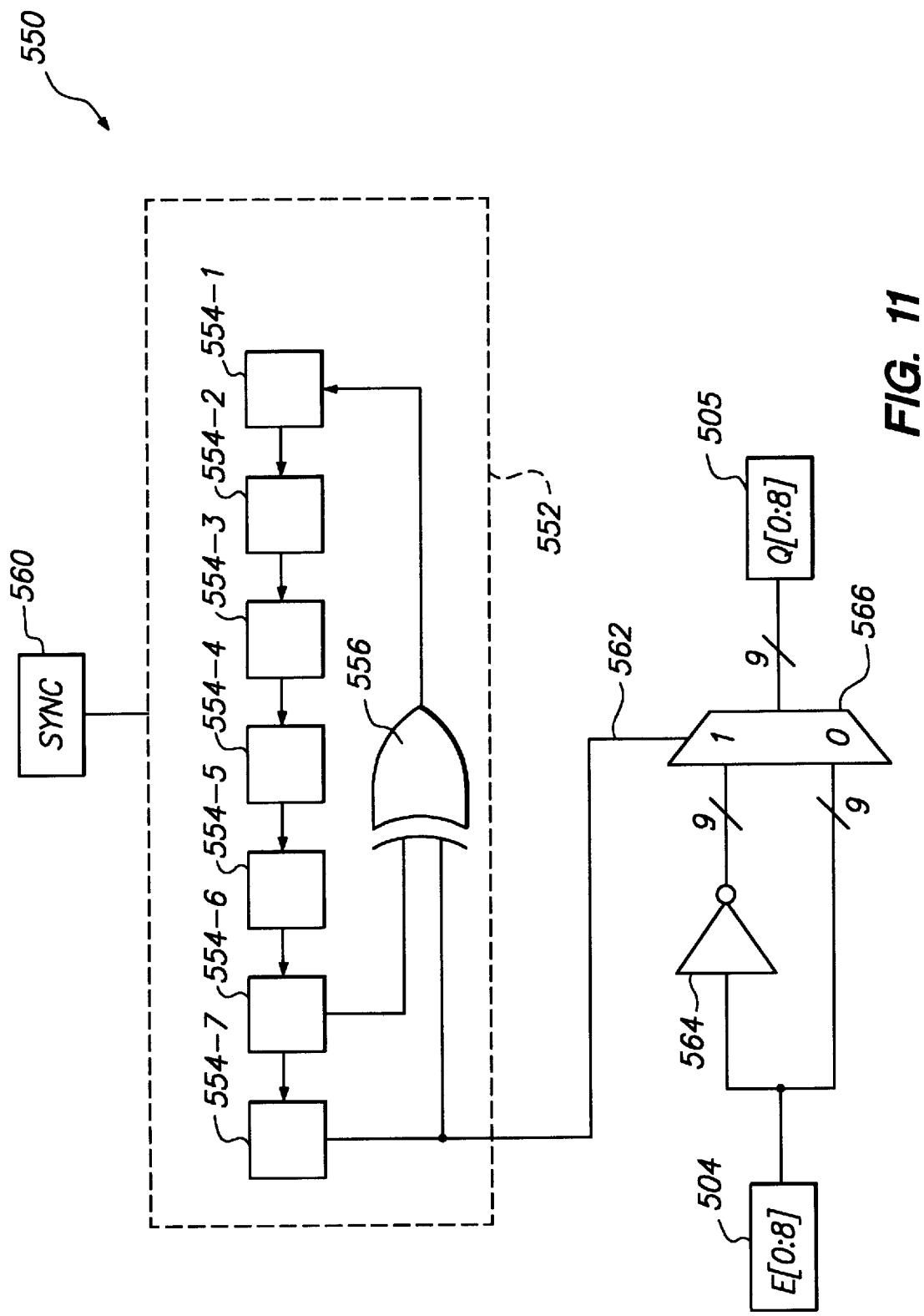
FIG. 11 depicts a balance-encoding circuit for DC-balancing a transition-optimized frame using frame-synchronous scrambling.

FIG. 11 depicts a balance-encoding circuit 550 for DC-balancing a 9-bit transition-optimized frame using frame-synchronous scrambling. Balance-encoding circuit 550 takes as input a 9-bit transition-optimized frame 504 and produces as output a 9-bit DC-balance-encoded frame 505. Although FIG. 11 depicts an exemplary embodiment showing DC-balancing of a 9-bit transition-optimized frame, the invention disclosed requires neither that an incoming frame be 9 bits in length, nor that an incoming frame be transition-optimized.

Balance-encoding circuit 550 employs a shift register generator (SRG) 552, which includes a plurality of one-bit shift registers 554-1 through 554-7 and XOR gate 565. Shift Registers 554-1 through 554-7 are initialized with an arbitrary predetermined non-zero value under control of SYNC signal 560. The SRG is organized in such a manner that the sequence of shift registers 554-1 through 554-7 make up a pseudo-random binary sequence (PRBS) used for scrambling. In operation, two predetermined bits of the PRBS are XORed, and the resulting value is used to DC-balance an unbalanced 9-bit frame.

The PRBS is disposed to repeatedly cycle through a series of values. The period of the cycle is dependent on the number of shift registers employed in the SRG. The period is equal to $2^N-1$, where N is the number of shift registers employed. In the exemplary embodiment shown in FIG. 11, 7 shift registers are employed, resulting in a period of $2^7-1=127$.

As the SRG is clocked, the contents of each shift register (with the exception of high-order shift register 554-7) are loaded into the next-higher-order shift register. That is, the contents of low-order shift register 554-1 are loaded into next-higher-order shift register 554-2; the contents of shift register 554-2 are loaded into shift register 554-3, and so on, until the contents of shift register 554-6 have been loaded into shift register 554-7. Concurrent with these shifts, the contents of the two highest order shift registers 554-6 and 554-7 are presented as input to XOR gate 556. The resulting value is passed from XOR gate 565 to low-order shift register 554-1. In addition, the contents of high-order shift register 554-7 are presented as control signal 562, which is used to control the selective inversion of balance-unencoded frame 504 to produce balance-encoded frame 505.

Balance-unencoded frame 504 is presented to inverter 566, and the resulting 9-bit inverted frame is presented as an input to selector 568. In addition, balance-unencoded frame 504 is presented without inversion as a second input to selector 568. Selector 568 operates under the control of control signal 562 from SRG 552. If control signal 562 is '1', the inverted frame is selected and presented as balance-encoded frame 505; otherwise, the uninverted frame is selected and presented as balance-encoded frame 505.

Figure 12:
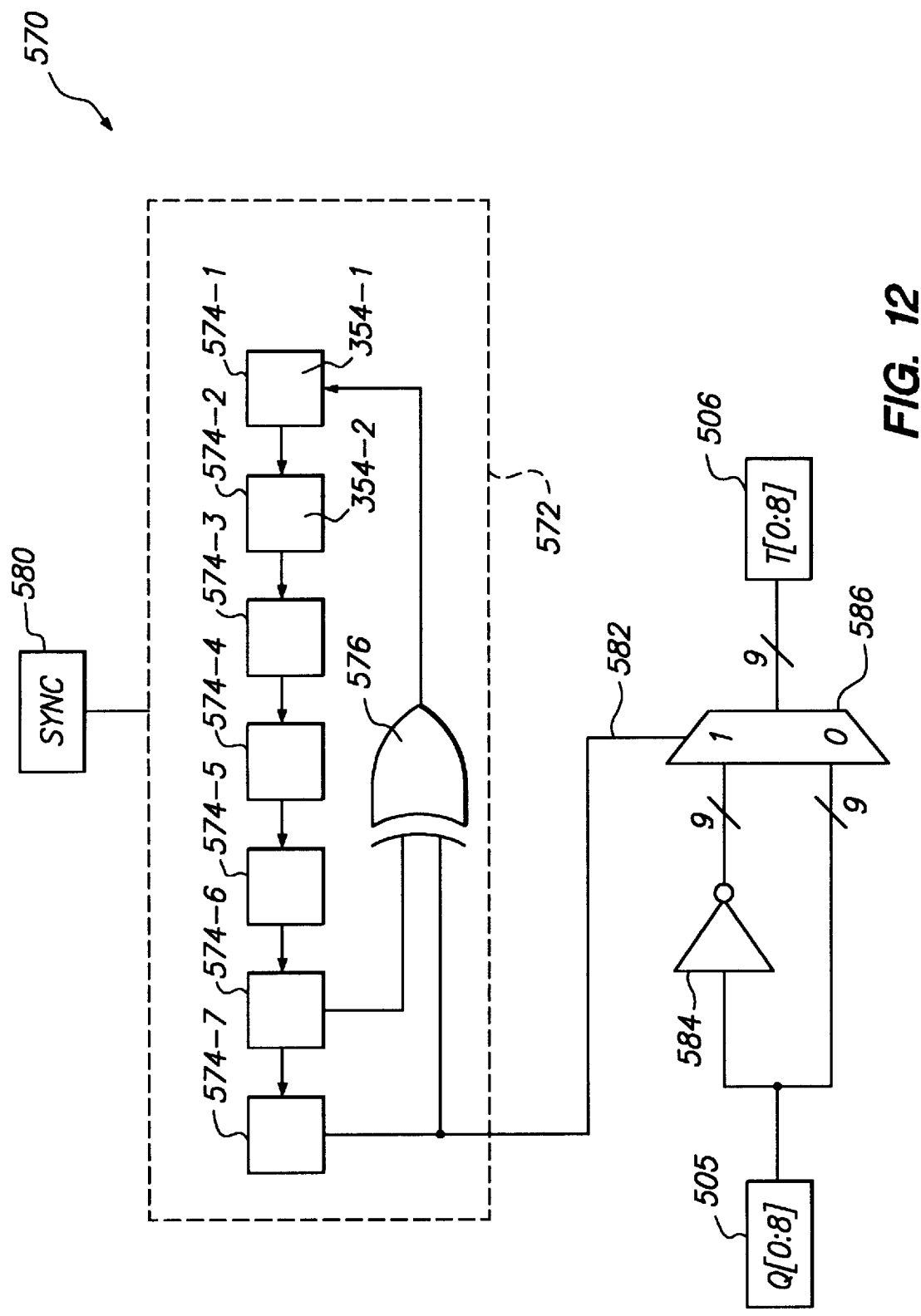
FIG. 12 depicts a balance-decoding circuit for decoding a DC-balanced frame encoded with the balance-encoding circuit of FIG. 11.

FIG. 12 depicts a balance-decoding circuit 570 for decoding a 9-bit DC-balance-encoded frame using frame-synchronous scrambling. Balance-decoding circuit 570 takes as input a 9-bit balance-encoded frame 505 and produces as output a balance-decoded 9-bit transition-optimized frame 506 ('T').

Balance-decoding circuit 570 employs a shift register generator 572. SRG 572 is of identical order to SRG 552, and is set to the same initial state. That is, SRG 572 has the same number of shift registers as SRG 552, and is initialized to the same arbitrary predetermined non-zero value in response to SYNC signal 580. SRG 572 operates identically to SRG 552, and generates an identical PRBS in operation. Accordingly, for each DC-balanced frame 505 received, the value of control signal 582 is assured of being identical to the value of control signal 562 used to selectively invert the balance-unencoded frame 504. Accordingly, control signal 582 may be employed to selectively invert balance-encoded frame 505 in order to produce balance-decoded frame 506, the value of which is assured of being equal to the balance-unencoded frame 504 provided to Balance-encoding circuit 550.

Balance-encoded frame 505 is seen to be presented to inverter 584, and the resulting 9-bit inverted frame is provided as one input to selector 586. In addition, balance-encoded frame 505 is presented uninverted as a second input to selector 586. Selector 586 operates under the control of control signal 582 from SRG 572. If control signal 582 is '1', the inverted frame is selected and presented as balance-decoded frame 506; otherwise, the uninverted frame is selected and presented as balance-decoded frame 505.

Frame-wise DC-balancing using a Self-Synchronous Scrambler for 8B/9B coding.

Figure 13:
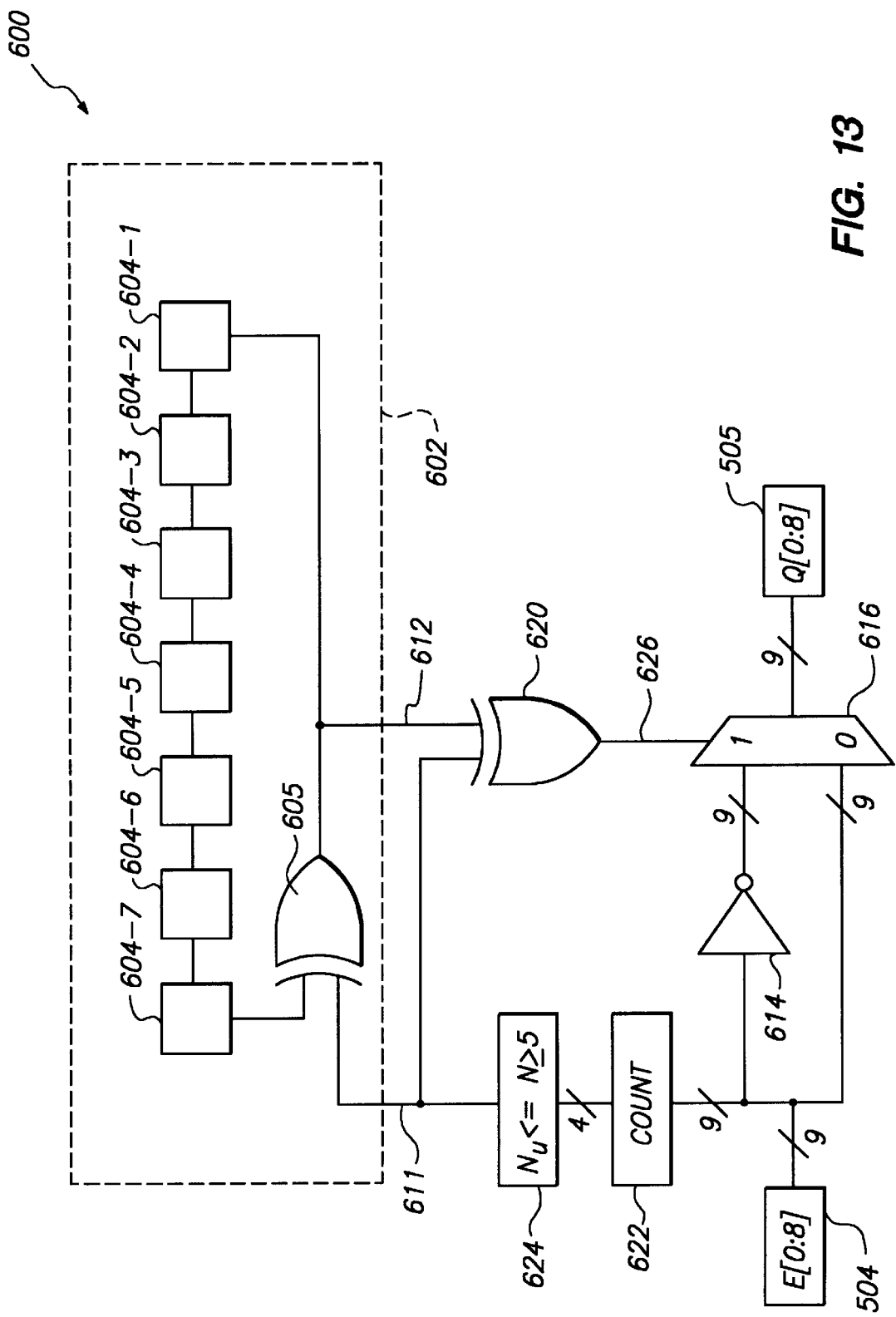
FIG. 13 depicts a balance-encoding circuit for DC-balancing a transition-optimized frame using self-synchronous scrambling.

FIG. 13 depicts a balance-encoding circuit 600 for DC-balancing a 9-bit transition-optimized frame using self-synchronous scrambling (SSS). Balance-encoding circuit 600 takes as input a 9-bit unbalanced transition-optimized frame 504 and produces as output a 9-bit DC-balance-encoded frame 505. Although FIG. 13 depicts an exemplary embodiment showing DC-balancing of a 9-bit transition-optimized frame, the invention disclosed requires neither that an incoming frame be 9 bits in length, nor that an incoming frame be transition-optimized.

Balance-encoding circuit 600 includes a shift register generator (SRG) 602 comprised of a plurality of one-bit shift registers 604-1 through 604-7 and XOR gate 605. Shift Registers 604-1 through 604-7 are initialized with an arbitrary predetermined value. The SRG is organized in such a manner that the sequence of shift registers 604-1 through 604-7 make up a pseudo-random binary sequence (PRBS) that will be used for scrambling. In operation, a predetermined bit (e.g., bit 604-7) of the PRBS is XORed with a signal supplied as input to the SRG, and the resulting value is used in DC-balancing an unbalanced 9-bit frame.

As the SRG is clocked during operation, the contents of each shift register (with the exception of high-order shift register 604-7) are loaded into the next-higher-order shift register. That is, the contents of low-order shift register 604-1 are loaded into next-higher-order shift register 604-2; the contents of shift register 604-2 are loaded into shift register 604-3, and so on, until the contents of shift register 604-6 are loaded into shift register 604-7. Concurrent with these shifts, the contents of highest order shift register 604-7 and an input signal 611 are presented as input to XOR gate 605. The resulting value is passed from XOR gate 605 to low-order shift register 604-1. In addition, the value from XOR gate 605 is presented as output signal 612, which is used in derivation of a control signal 626. The control signal 626 controls the selective inversion of balance-unencoded frame 504 to produce balance-encoded frame 505.

Balance-unencoded frame 504 is seen to be presented to counter 622, which is disposed to count the number of 1-bits in balance-unencoded frame 504 and pass the count (N) to logic 624. Logic 624 sets signal Nu to logic '1' if N is greater than or equal to 5, and sets Nu to logic '0' otherwise. As is indicated by FIG. 13, the signal Nu is presented as input signal 611 to SRG 602 and is also provided to XOR gate 620.

XOR gate 620 performs an exclusive-or operation on the value passed from logic 624 and SRG output signal 612 to produce control signal 626. Control signal 626 is used to control the selective inversion of balance-unencoded frame 504 to produce balance-encoded frame 505.

Balance-unencoded frame 504 is additionally presented to inverter 614. The resulting 9-bit inverted frame is presented as one input to selector 618. In addition, balance-unencoded frame 504 is presented uninverted as a second input to selector 618. Selector 618 operates under the control of control signal 626 from XOR gate 620. If control signal 626 is '1', the inverted frame is selected and presented as balance-encoded frame 505; otherwise, the uninverted frame is selected and presented as balance-encoded frame 505.

Figure 14:
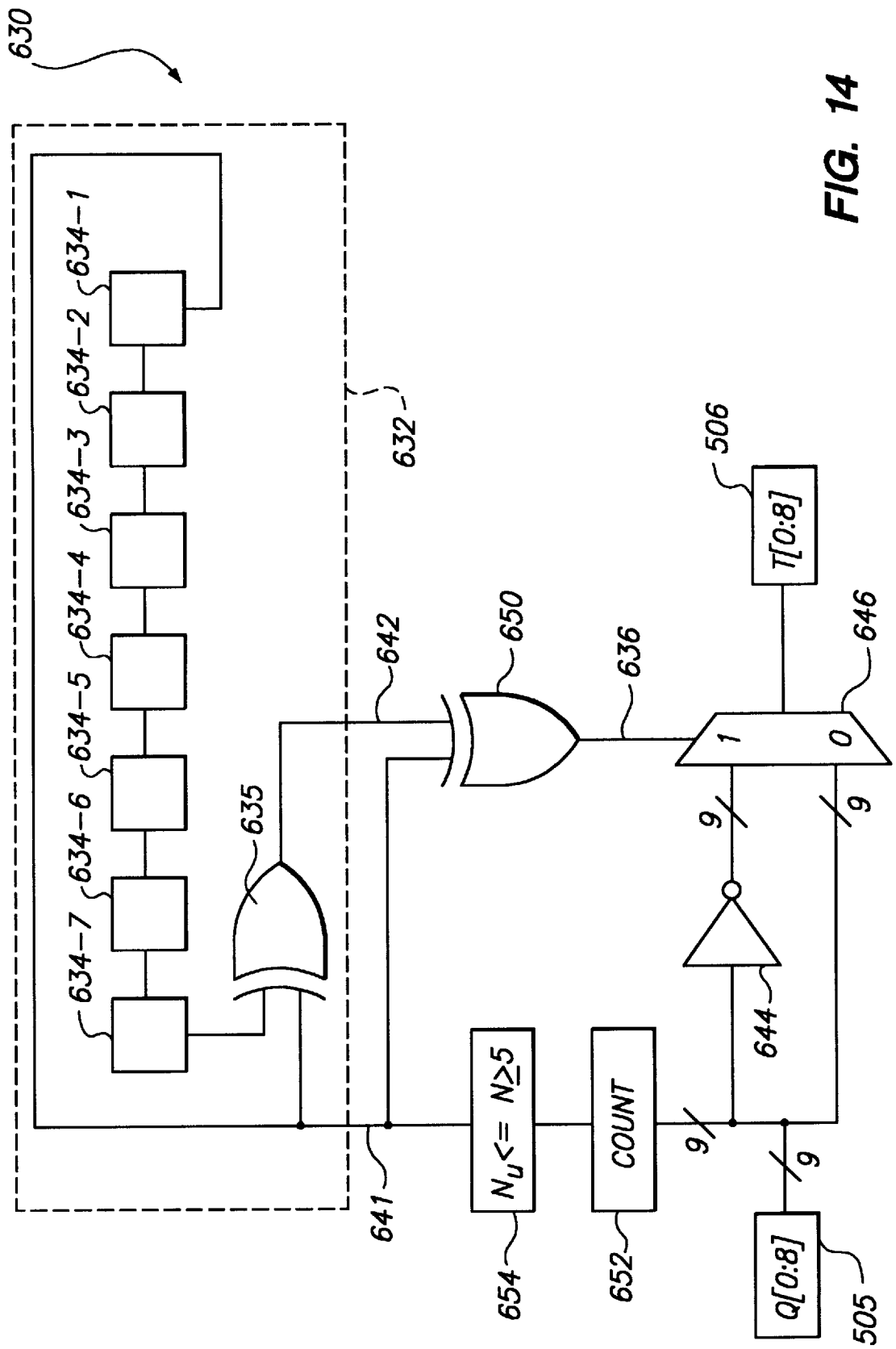
FIG. 14 depicts a balance-decoding circuit for decoding a DC-balanced frame encoded with the balance-encoding circuit of FIG. 13.

FIG. 14 depicts a balance-decoding circuit 630 for decoding a 9-bit DC-balance-encoded frame using self-synchronous scrambling. Balance-decoding circuit 630 takes as input a 9-bit balance-encoded frame 505 and produces as output a balance-decoded 9-bit transition-optimized frame 506, labeled 'T'.

Balance-decoding circuit 630 employs a shift register generator 632. SRG 632 is identical in order to SRG 602 and is set to the same initial state. That is, SRG 632 has the same number of shift registers as SRG 602, and is initialized to the same arbitrary predetermined value. In operation, a predetermined bit (e.g., bit 634-7) of the PRBS is XORed with a signal supplied as input to the SRG, and the resulting value is used in DC-balancing an unbalanced 9-bit frame.

As the SRG is clocked during operation, the contents of each shift register (with the exception of high-order shift register 634-7) are loaded into the next-higher-order shift register. That is, the contents of low-order shift register 634-1 are loaded into next-higher-order shift register 634-2; the contents of shift register 634-2 are loaded into shift register 634-3, and so on, until the contents of shift register 634-6 are loaded into shift register 634-7. Concurrent with these shifts, an input signal 641 is passed to low-order shift register 634-1. In addition, the contents of highest order shift register 634-7 and input signal 641 are presented as input to XOR gate 635. The resulting value is presented as output signal 642, which is used in derivation of a control signal 636.

Accordingly, for each DC-balanced frame 505 received, the value of control signal 636 is assured to be identical to the value of control signal 626 that was used to selectively invert the balance-unencoded frame 504. Accordingly, control signal 636 is employed to selectively invert balance-encoded frame 505 to produce balance-decoded frame 506, which is of a value assured to be equal to the balance-unencoded frame 504 provided to balance-encoding circuit 600.

Balance-encoded frame 505 is seen to be presented to inverter 644, and the resulting 9-bit inverted frame presented as one input to selector 646. In addition, balance-encoded frame 505 is presented uninverted as a second input to selector 646. Selector 646 operates under the control of control signal 636, which is derived by performing an XOR operation with SRG output signal 642 and the output of logic 654. If control signal 636 is '1', the inverted frame is selected and presented as balance-decoded frame 506; otherwise, the uninverted frame is selected and presented as balance-decoded frame 505.

The previous description of the preferred embodiments has been provided to enable any person skilled in the art to make or use the present invention. Various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. A method for producing a DC-balanced sequence of characters from an input sequence of 8 bit data blocks, said method including the steps of:

selectively complementing bits in said 8 bit data blocks in accordance with a number of logical signals of predefined type in each said 8 bit data block in order to produce selectively complemented data blocks;

determining a cumulative disparity in the number of logical values of different type included within ones of said selectively complemented data blocks previously encoded into ones of said characters;

determining a current disparity in a candidate character associated with a current one of said selectively complemented data blocks being encoded; and assigning said candidate character to said current one of said selectively complemented data blocks if said current disparity is of a polarity opposite to a first polarity of said cumulative disparity, and assigning the complement of said candidate character to said current one of said selectively complemented data blocks if said current disparity is of said first polarity.

2. The method of claim 1 wherein said step of selectively complementing includes the step of selectively complementing predetermined ones of said bits in said 8 bit data blocks having fewer than a predetermined number of said logical signals of predefined type.

3. The method of claim 1 wherein said step of selectively complementing includes the step of selectively complementing predetermined ones of said bits in said 8 bit data blocks having more than a predetermined number of said logical signals of predefined type.

4. The method of claim 1 further including the step of setting a predetermined bit in said candidate character to a first logical value when a current 8 bit data block associated therewith has fewer than a predetermined number of logical signals of predefined type, and setting said predetermined bit to the complement of said first logical value otherwise.

5. The method of claim 1 further including the step of setting a predetermined bit said candidate character to a first logical value when a current 8 bit data block associated therewith has more than a predetermined number of logical signals of predefined type, and setting said predefined bit to the complement of said first logical value otherwise.

6. The method of claim 1 wherein the logical value of a predetermined bit in each character assigned to one of said selectively complemented data blocks indicates whether a candidate character or complement thereof was assigned to said selectively complemented data block.

7. The method of claim 1 wherein said step of determining a current disparity in a candidate character includes the step of performing a logic analysis upon bits of said candidate character.

8. The method of claim 1 further including the step of assigning specific ones of said 8 bit data blocks having fewer than a predetermined number of logical signals of predefined type to be representative of special characters, said special characters being encoded distinctly from ones of said 8 bit data blocks not corresponding to ones of said special characters.

9. A binary data encoding apparatus for producing a DC balanced sequence of characters from an input sequence of 8 bit data blocks, said binary data encoding apparatus comprising:

means for selectively complementing bits in said 8 bit data blocks in accordance with a number of logical signals of predefined type in each said 8 bit data block in order to produce selectively complemented data blocks;

means for determining a cumulative disparity in the number of logical values of different type included within ones of said selectively complemented data blocks previously encoded into ones of said characters;

means for determining a current disparity in a candidate character associated with a current one of said selectively complemented data blocks being encoded; and means for assigning said candidate character to said current one of said selectively complemented data blocks if said current disparity is of a polarity opposite to a first polarity of said cumulative disparity, and assigning the complement of said candidate character to said current one of said selectively complemented data blocks if said current disparity is of said first polarity.

10. The binary data encoding apparatus of claim 9 wherein said means for selectively complementing includes means for selectively complementing predetermined ones of said bits in said 8 bit data blocks having fewer than a predetermined number of said logical signals of predefined type.

11. The binary data encoding apparatus of claim 9 wherein said means for selectively complementing includes means for selectively complementing predetermined ones of said bits in said 8 bit data blocks having more than a predetermined number of said logical signals of predefined type.

12. The binary data encoding apparatus of claim 9 further including means for setting a predetermined bit in said candidate character a first logical value when said current 8 bit data block has fewer than a predetermined number of logical signals of predefined type, and means for setting said predetermined bit to the complement of said first logical value otherwise.

13. The binary data encoding apparatus of claim 9 further including means for setting a predetermined bit in said candidate character to a first logical value when said current 8 bit data block has more than a predetermined number of logical signals of predefined type, and means for setting said predetermined bit to the complement of said first logical value otherwise.

14. The binary data encoding apparatus of claim 9 wherein the logical value of a predetermined bit in each character assigned to one of said selectively complemented data blocks indicates whether a candidate character or complement thereof was assigned to said selectively complemented data block.

15. The binary data encoding apparatus of claim 9 wherein said means for determining a current disparity in a candidate character includes means for performing a logic analysis upon bits of said candidate character.

16. The binary data encoding apparatus of claim 9 further including means for assigning specific ones of said 8 bit data blocks having fewer than a predefined number of logical signals of predefined type to be representative of special characters and for encoding said special characters distinctly from ones of said 8 bit data blocks not corresponding to ones of said special characters.

17. A method for high speed transmission of digital data comprising the steps of:

encoding an input sequence of 8 bit data blocks into a sequence of characters by: (i) selectively complementing bits in an input sequence of 8 bit data blocks in accordance with the number of logical signals of predefined type in each said 8 bit data block in order to produce selectively complemented data blocks, (ii) determining a cumulative disparity in logical values associated with ones of said selectively complemented data blocks previously encoded into ones of said characters, (iv) determining a current disparity in a candidate character associated with a current one of said selectively complemented data blocks being encoded, and (iv) assigning said candidate character to said current one of said selectively complemented data blocks if said current disparity is of a polarity opposite to a first polarity of said cumulative disparity, and assigning the complement of said candidate character to said current one of said selectively complemented data blocks if said current disparity is of said first polarity;

converting each character into a serial data string; and transmitting each said serial data string over a serial communication link.

* * * * *

UNITED STATES PATENT AND TRADEMARK OFFICE
CERTIFICATE OF CORRECTION

PATENT NO. : 5,825,824

DATED : October 20, 1998

INVENTOR(S) : Kyeongho Lee and Deog Kyoon Jeong

It is certified that error appears in the above-identified patent and that said Letters Patent is hereby corrected as shown below:

```
Title page, item [75],
```
Inventors: Replace "Deog-Kyon Jeong" with ---Deog Kyoon Jeong---.

Signed and Sealed this

Twenty-fifth Day of July, 2000

Attest:

Q. TODD DICKINSON

*Attesting Officer*  *Director of Patents and Trademarks*